(12) United States Patent
Tamaki

(10) Patent No.: US 7,474,646 B2
(45) Date of Patent: Jan. 6, 2009

(54) WIRELESS COMMUNICATION SYSTEM, NODE POSITION CALCULATION METHOD AND NODE

(75) Inventor: Tsuyoshi Tamaki, Palo Alto, CA (US)

(73) Assignee: Hitachi, Ltd., Tokyo (JP)

( * ) Notice: Subject to any disclaimer, the term of this patent is extended or adjusted under 35 U.S.C. 154(b) by 465 days.

(21) Appl. No.: 11/287,403

(22) Filed: Nov. 28, 2005

(65) Prior Publication Data
US 2006/0268795 A1 Nov. 30, 2006

(30) Foreign Application Priority Data
May 27, 2005 (JP) ............................. 2005-155194

(51) Int. Cl.
*H04Q 7/24* (2006.01)
(52) U.S. Cl. .................... 370/338; 370/310; 370/328; 455/41.2; 455/41.3; 455/418; 455/419; 455/420; 455/456.1; 455/456.2; 455/456.3; 455/456.5; 455/456.6; 455/573; 455/574
(58) Field of Classification Search ............... 370/310, 370/328, 338; 455/41.2, 418, 419, 420, 456.1–456.6, 455/573, 574
See application file for complete search history.

(56) References Cited
U.S. PATENT DOCUMENTS 6,314,281 B1 * 11/2001 Chao et al. ............... 455/404.2
6,473,038 B2 * 10/2002 Patwari et al. ............... 342/450
6,735,448 B1 * 5/2004 Krishnamurthy et al. .... 455/522
6,751,455 B1 * 6/2004 Acampora ............... 455/414.1
6,768,909 B1 * 7/2004 Irvin ...................... 455/456.1
7,006,453 B1 * 2/2006 Ahmed et al. ............... 370/255
7,107,065 B2 * 9/2006 Overy et al. ............. 455/456.2
2004/0046693 A1 3/2004 Ogino et al.

OTHER PUBLICATIONS

Andreas Savvides, "Dynamic Fine-Grained Localization in Ad-Hoc Networks of Sensors", Networked and Embedded Systems Lab, Department of Electrical Engineering, University of California, 14 pages, no date provided.

* cited by examiner

Primary Examiner—Stephen M D'Agosta
(74) Attorney, Agent, or Firm—Reed Smith LLP; Stanley P. Fisher, Esq.; Juan Carlos A. Marquez, Esq.

(57) ABSTRACT

A wireless communication system that detects a position of a node using an appropriate position detection method. The invention is based upon a wireless communication system provided with a plurality of nodes that mutually communicate and a server that detects a position of the node using communication between the nodes and is characterized in that the node has a battery for supplying power, measures the status of the battery, notifies the server of the measured status of the battery, the server determines a position detection method of the node based upon the status notified by the node of the battery and calculates a position of the node by the determined position detection method.

6 Claims, 26 Drawing Sheets

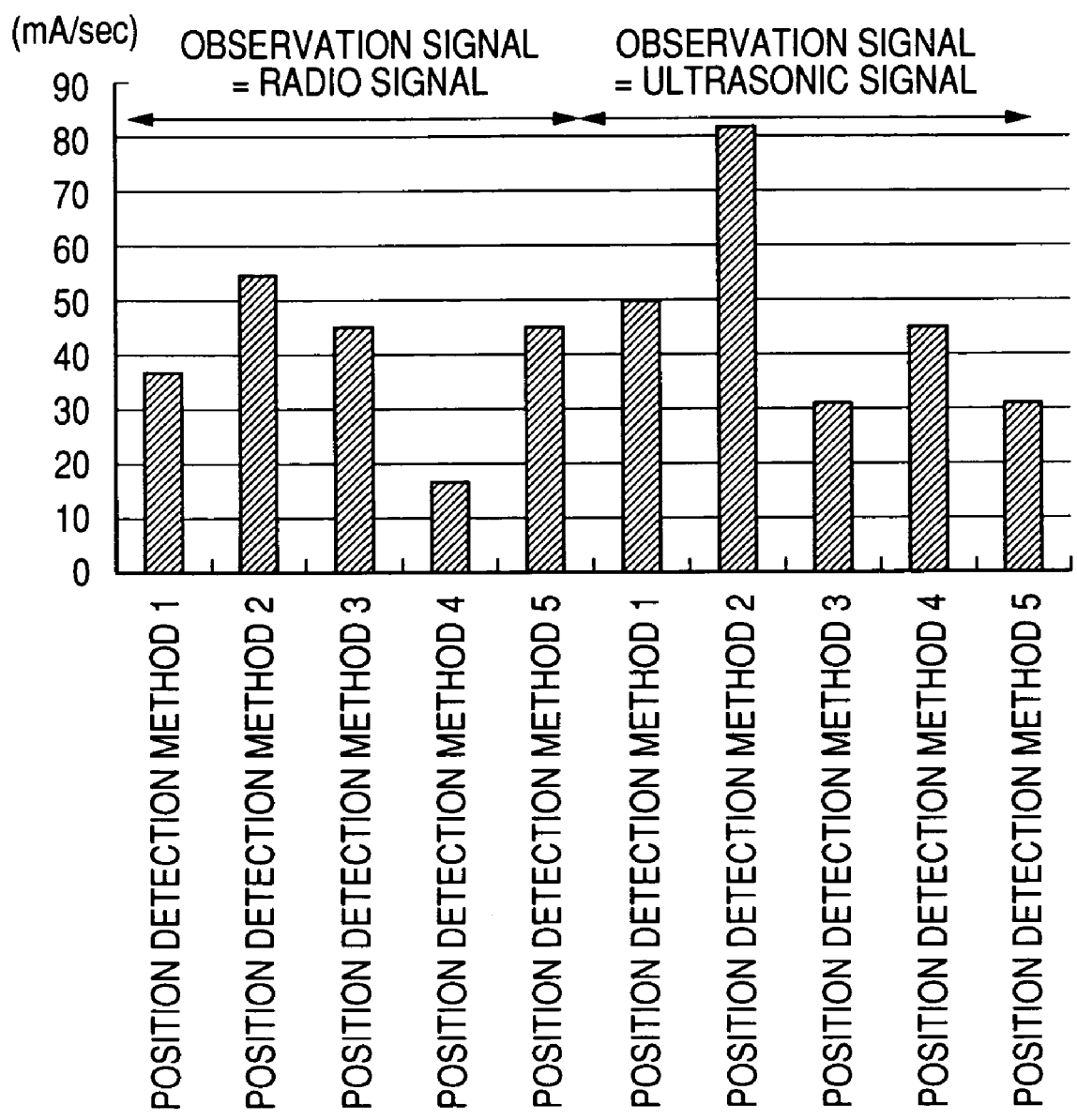

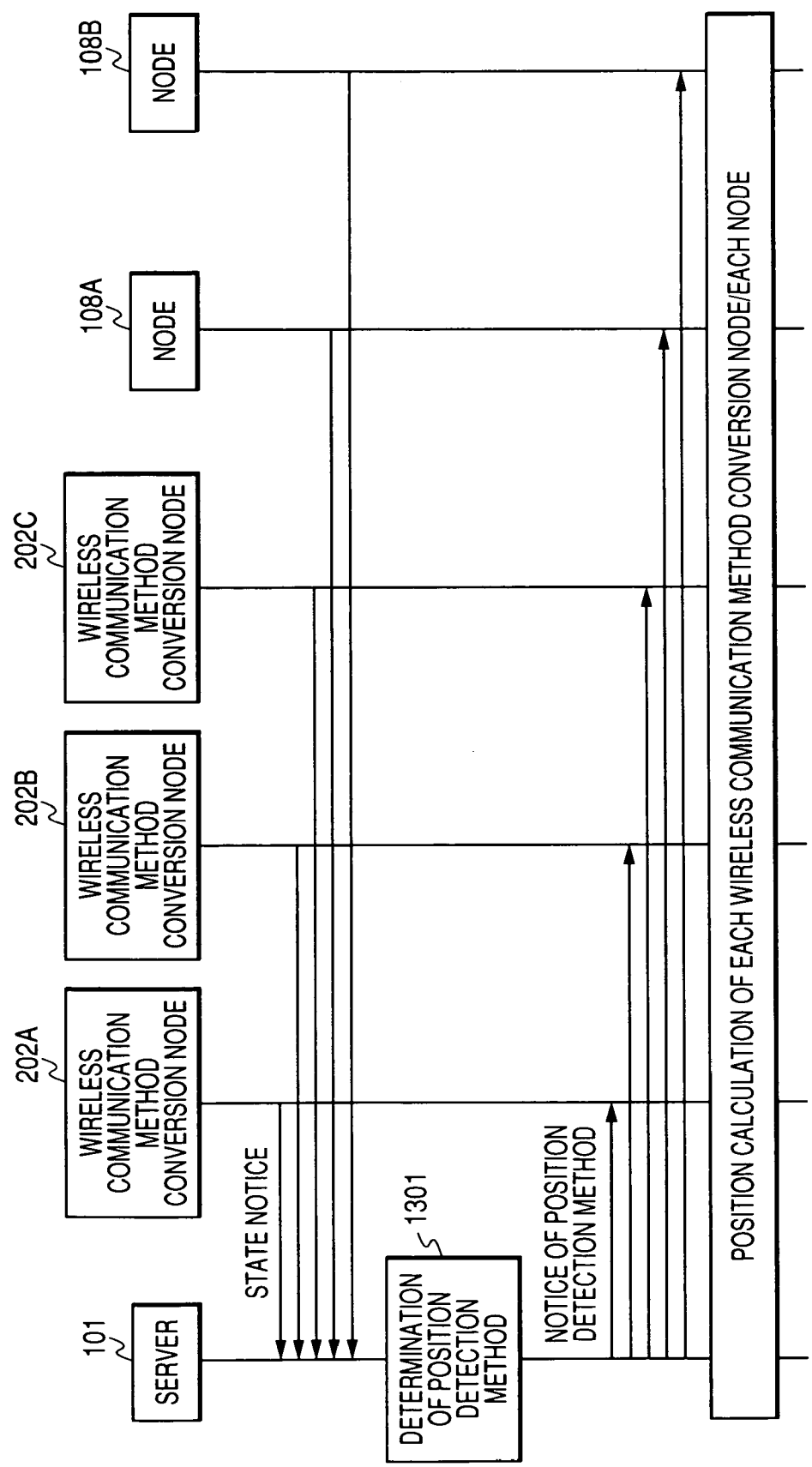

FIG. 19A

| WIRELESS COMMUNICATION METHOD CONVERSION NODE NAME | BATTERY OUTPUT POWER | BATTERY EXCHANGE DATE | CUMULATIVE POWER CONSUMPTION | MEASUREMENT ACCURACY | POSITION DETECTION TIME |
|---|---|---|---|---|---|
| 1601 | 1602 | 1603 | 1604 | 1605 | 1606 |
| WIRELESS COMMUNICATION METHOD CONVERSION NODE 202A | 1.2 V | 2004/1/2 | X1 mAh | 30 cm | 0.5 sec |
| WIRELESS COMMUNICATION METHOD CONVERSION NODE 202B | 1.2 V | 2004/1/2 | X2 mAh | 1.7 m | 0.6 sec |

MEASUREMENT STATE TABLE 1600

FIG. 19B

| WIRELESS COMMUNICATION METHOD CONVERSION NODE NAME | POSITION DETECTION METHOD | OBSERVATION SIGNAL | ESTIMATED POWER CONSUMPTION | ESTIMATED POSITION DETECTION ACCURACY | ESTIMATED POSITION DETECTION TIME |
|---|---|---|---|---|---|
| 1611 | 1612 | 1613 | 1614 | 1615 | 1616 |
| WIRELESS COMMUNICATION METHOD CONVERSION NODE 202A | 1 | ULTRASONIC SIGNAL | Y1 mAh | 30 cm | 1 sec |
| WIRELESS COMMUNICATION METHOD CONVERSION NODE 202B | 2 | RADIO SIGNAL | Y2 mAh | 3 m | 1 sec |

POSITION DETECTION METHOD SELECTION TABLE 1610

FIG. 19C

| WIRELESS COMMUNICATION METHOD CONVERSION NODE NAME | BATTERY EXCHANGE ESTIMATED DATE | ESTIMATED MEASUREMENT ACCURACY | ESTIMATED POSITION DETECTION TIME |
|---|---|---|---|
| 1621 | 1622 | 1623 | 1624 |
| WIRELESS COMMUNICATION METHOD CONVERSION NODE 202A | 2005/3/2 | 30 cm | 0.5 sec |
| WIRELESS COMMUNICATION METHOD CONVERSION NODE 202B | 2005/3/10 | 1.7 m | 0.6 sec |

ESTIMATE LIST TABLE 1620

FIG. 20A

MEASUREMENT STATE TABLE 1650

| NODE NAME 1651 | BATTERY OUTPUT POWER 1652 | BATTERY EXCHANGE DATE 1653 | CUMULATIVE POWER CONSUMPTION 1654 | MEASUREMENT ACCURACY 1655 | POSITION DETECTION TIME 1656 |
|---|---|---|---|---|---|
| NODE 108A | 1.3 V | 2004/4/2 | X3 mAh | 30 cm | 7 sec |
| NODE 108B | 1.5 V | 2005/1/2 | X4 mAh | 2.5 m | 12 sec |

FIG. 20B

POSITION DETECTION METHOD SELECTION TABLE 1660

| NODE NAME 1661 | POSITION DETECTION METHOD 1662 | OBSERVATION SIGNAL 1663 | ESTIMATED POWER CONSUMPTION 1664 | ESTIMATED POSITION DETECTION ACCURACY 1665 | ESTIMATED POSITION DETECTION TIME 1666 |
|---|---|---|---|---|---|
| NODE 108A | 3 | ULTRASONIC SIGNAL | Y3 mAh | 30 cm | 3 sec |
| NODE 108B | 5 | RADIO SIGNAL | Y4 mAh | 3 m | 2 sec |

FIG. 20C

ESTIMATE LIST TABLE 1670

| NODE NAME 1671 | BATTERY EXCHANGE ESTIMATED DATE 1672 | ESTIMATED MEASUREMENT ACCURACY 1673 | ESTIMATED POSITION DETECTION TIME 1674 |
|---|---|---|---|
| NODE 108A | 2005/3/4 | 30 cm | 7 sec |
| NODE 108B | 2005/5/2 | 2.5 m | 12 sec |

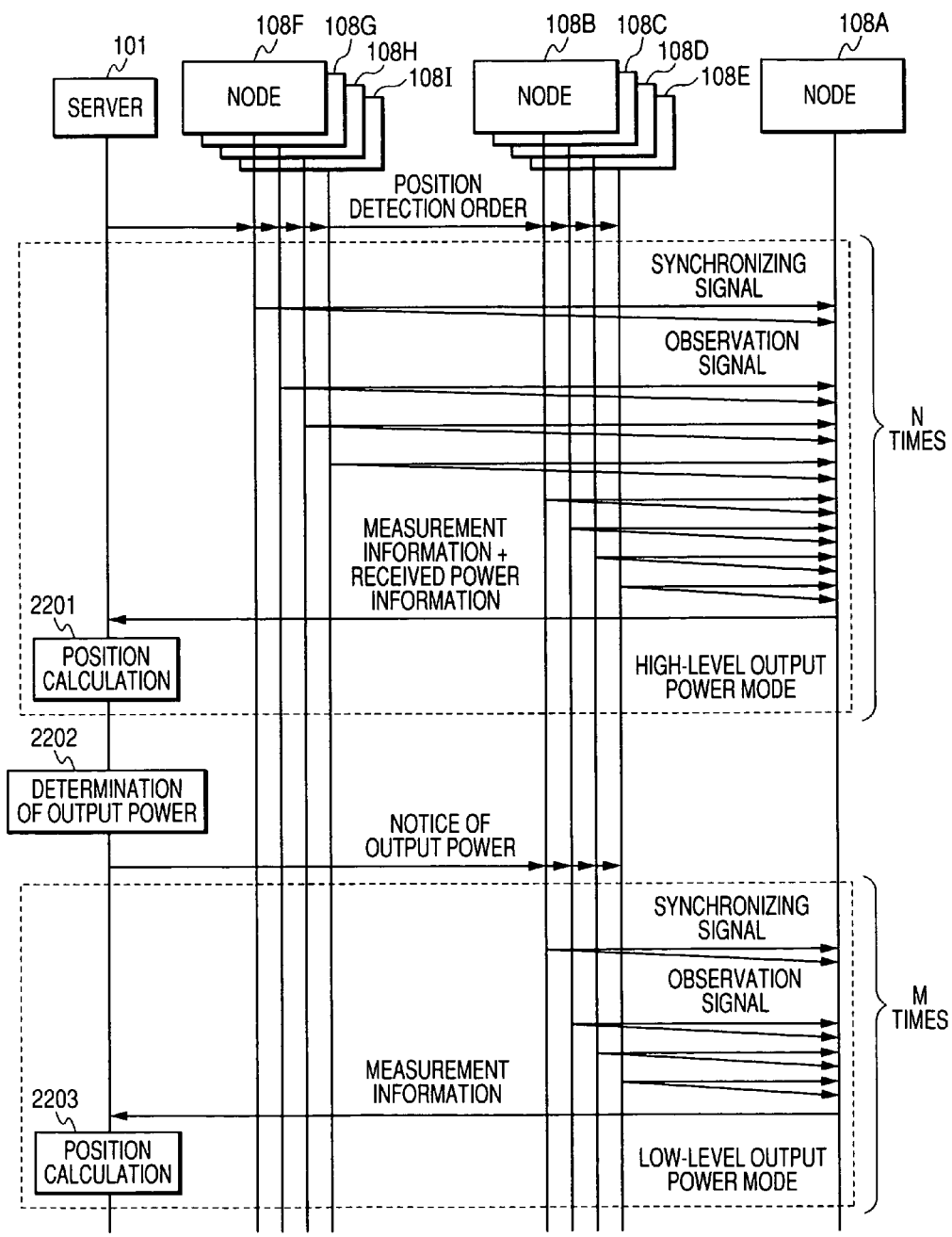

WIRELESS COMMUNICATION SYSTEM, NODE POSITION CALCULATION METHOD AND NODE

CLAIM OF PRIORITY

The present application claims priority from Japanese application JP 2005-155194 filed on May 27, 2005, the content of which is hereby incorporated by reference into this application.

FIELD OF THE INVENTION

The present invention relates to a wireless communication system configured by multiple nodes and more particularly to technique for calculating a position of a node.

BACKGROUND OF THE INVENTION

A plurality of methods of obtaining (measuring) a position of a node in a wireless communication system configured by multiple nodes are known (for example, refer to "Dynamic fine-grained localization in Ad-hoc wireless sensor networks" in the proceedings written by A. Savvides, C. C. Han and M. B. Srivastava of the International Conference on Mobile Computing and Networking (MobiCom) 2001 in Rome, Italy in July, 2001). The node includes a terminal used by a user or a sensor node. The sensor node is a terminal mounting a sensor for measuring ambient environment.

Representative node position detection methods will be described below.

A wireless communication system calculates distance between nodes based upon received signal strength (RSS) between the nodes. The wireless communication system obtains positions of the nodes by the trilateration of the calculated distance between the nodes.

In addition, the wireless communication system calculates distance between nodes based upon the time of arrival (ToA) of a signal between the nodes or time difference of arrival (TDoA). The wireless communication system obtains positions of the nodes by the trilateration of the calculated distance between the nodes.

In addition, the wireless communication system measures an angle of arrival (AoA) of a signal between nodes. The wireless communication system obtains positions of the nodes by triangulation using the measured angle of arrival.

In addition, the wireless communication system obtains a position of a node by collating with a map showing relation between received signal strength and a node position.

In addition, for a position detection method outdoors, a global positioning system (GPS) is known. GPS calculates a position of a node based upon time difference of arrival calculated utilizing a radio wave from a satellite.

In addition, a trilateration system depending upon time difference of arrival calculated utilizing a radio wave from a wireless local area network (wireless LAN) is known.

In addition, a map collation system for obtaining a position of a node depending upon a map showing relation between received signal strength between nodes and a node position is known.

In addition, a trilateration system depending upon time of arrival of an ultrasonic signal between nodes is known.

A wireless communication system that connects plural nodes at multiple stages is known. The wireless communication system obtains a position in order from a host node. The wireless communication system obtains a position of a subordinate node using the position of the host node.

In a wireless communication system that connects plural nodes at multiple stages, when a battery of one node goes flat, a position of the node cannot be obtained. Further, the wireless communication system has a problem that positions of nodes which exist in a subordinate position of the node in which the battery goes flat cannot be obtained in a chain.

A conventional type wireless communication system obtains positions of all nodes using the same position detection method. Therefore, the conventional type wireless communication system has a problem that it cannot change the position detection method according to a characteristic and a condition of a node that is an object of position detection. Characteristics of a node is a node that regards the duration of a battery as important, a node that regards measurement accuracy as important and a node that regards position detection time as important for example. The condition of the node includes the residual capacity of a battery and the output voltage of the node.

The invention is made in view of the above-mentioned problems and the object is to provide a wireless communication system that detects a position of a node using an appropriate position detection method.

SUMMARY OF THE INVENTION

The invention is based upon a wireless communication system provided with plural nodes which communicate with each other and a server which detects a position of the node using communication between the nodes and is characterized in that each node has a battery for supplying power, measures a condition of the battery, informs the server of the measured condition of the battery; the server determines the position detection method of the node based upon the condition of the battery informed by the node and calculates the position of the node by the determined position detection method.

According to the invention, the wireless communication system can detect a position of a node using an appropriate position detection method. Further, the wireless communication system can reduce the power consumption of the battery of the node.

BRIEF DESCRIPTION OF THE DRAWINGS

Understanding of the present invention will be facilitated by consideration of the following detailed description of the preferred embodiments of the present invention taken in conjunction with the accompanying drawings, in which like numerals refer to like parts:

FIG. 16 is a graph showing the power consumption of the wireless communication method conversion node according to an aspect of the present invention;

FIG. 17 is a sequence diagram showing a position calculation process by the position detection system according to an aspect of the present invention;

FIG. 19A shows the configuration of a measurement state table in wireless communication method conversion node status management data according to an aspect of the present invention, FIG. 19B shows the configuration of a position detection method selection table in the wireless communication method conversion node status management data according to an aspect of the present invention, and FIG. 19C shows the configuration of an estimate list table in the wireless communication method conversion node status management data according to an aspect of the present invention;

FIG. 20A shows the configuration of a measurement state table in node status management data according to an aspect of the present invention, FIG. 20B shows the configuration of a position detection method selection table in the node status management data according to an aspect of the present invention, and FIG. 20C shows the configuration of an estimate list table in the node status management data according to an aspect of the present invention;

FIG. 26 is a sequence diagram showing the output power control in the position detection method 3 according to an aspect of the present invention.

DETAILED DESCRIPTION

It is to be understood that the figures and descriptions of the present invention have been simplified to illustrate elements that are relevant for a clear understanding of the present invention, while eliminating, for the purpose of clarity, many other elements found in a wireless communication system and node position calculation method. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Figure 1:
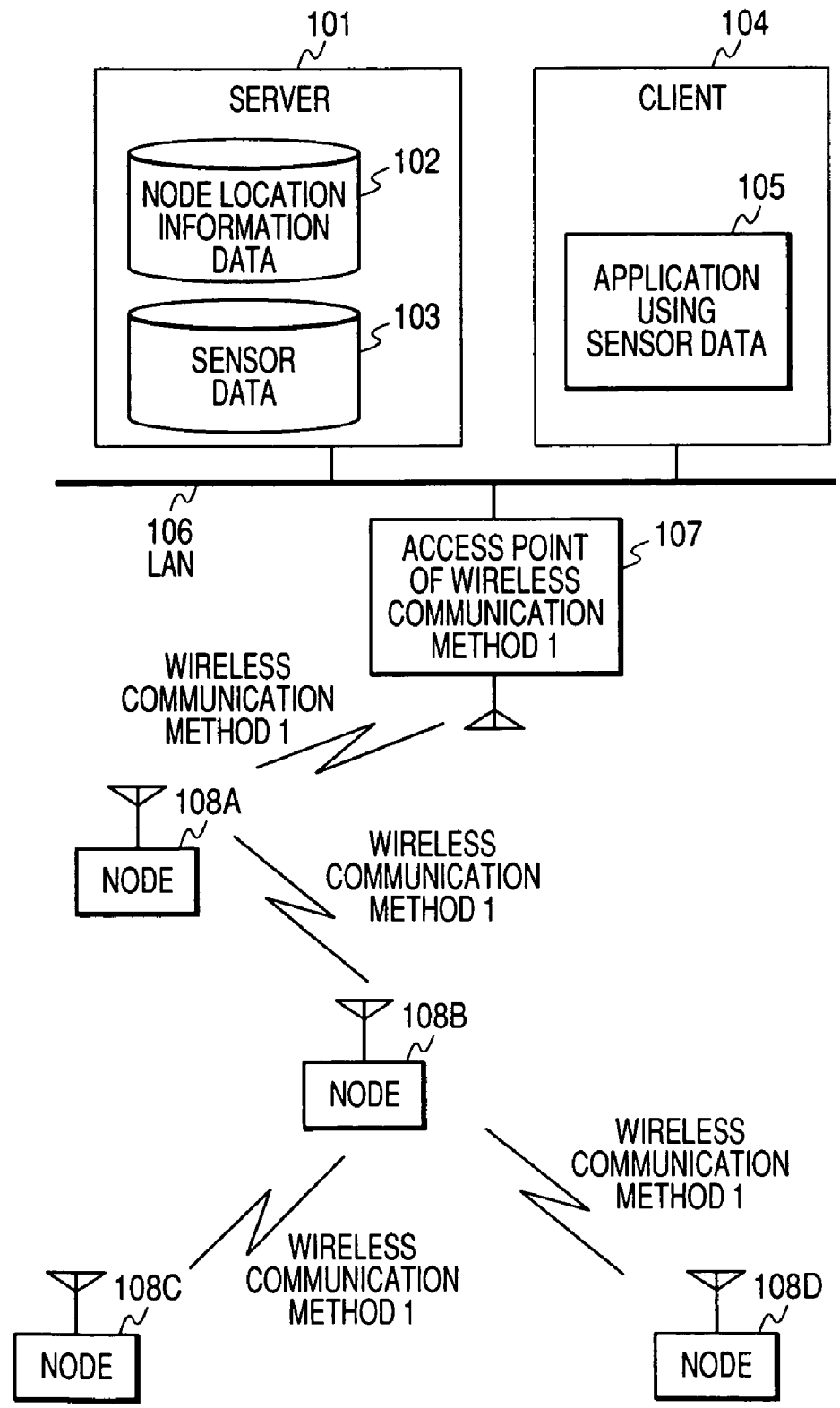
FIG. 1 is a block diagram showing a position detection system that communicates according to a single wireless communication method according to an aspect of the present invention.

FIG. 1 is a block diagram showing a position detection system that communicates by a single wireless communication method according to an aspect of the present invention.

The position detection system that communicates by the single wireless communication method has a server 101, a client 104, an access point 107 of a wireless communication method 1 and nodes 108A, 108B, 108C, 108D.

One access point 107 of the wireless communication method 1 is shown in FIG. 1, however, plural access points may be also provided. Four nodes 108A, 108B, 108C, 108D are shown in FIG. 1; however, the number of nodes is not limited.

The nodes 108 communicate with each other using the wireless communication method 1. The access point 107 of the wireless communication method 1 and the node 108A that exists in a communication range of the access point 107 communicate with each other using the wireless communication method 1. That is, in this explanatory drawing, the node 108A communicates with the other nodes 108B and others and the access point 107 of the wireless communication method 1 using the single wireless communication method 1.

The access point 107 of the wireless communication method 1, the server 101 and the client 104 are mutually connected via LAN 106.

The node 108A detects various information using a sensor although this is described later in relation to FIG. 3. The node 108A sends the detected information to the server 101 via the other nodes 108A and the access point 107 of the wireless communication method 1.

For example, the node 108D sends information to the server 101 via the node 108B, the node 108A and the access point 107 of the wireless communication method 1.

The access point 107 of the wireless communication method 1 transfers the information received from the node 108A and other nodes to the server 101.

The server 101 manages node location information data 102 and sensor data 103 although this is described later in relation to FIG. 6. The server 101 obtains positions of the nodes 108 by a method described later. The server stores the obtained positions of the nodes 108 in the node location information data 102. The server 101 receives information detected using the sensor by the node 108A and other nodes. The server stores the received information in the sensor data 103.

The server 101 can link the information detected by the nodes 108 and the positions of the nodes 108 by managing the node location information data 102 and the sensor data 103 together.

Further, the server 101 monitors conditions of batteries of the nodes 108. The server determines a position detection method used when the position of the node 108A is obtained according to the monitored conditions of the batteries.

The client 104 acquires the node location information data 102 and the sensor data 103 from the server 101. The client executes an application using the sensor data 105 using the respective acquired node location information data 102 and sensor data 103.

Figure 2:
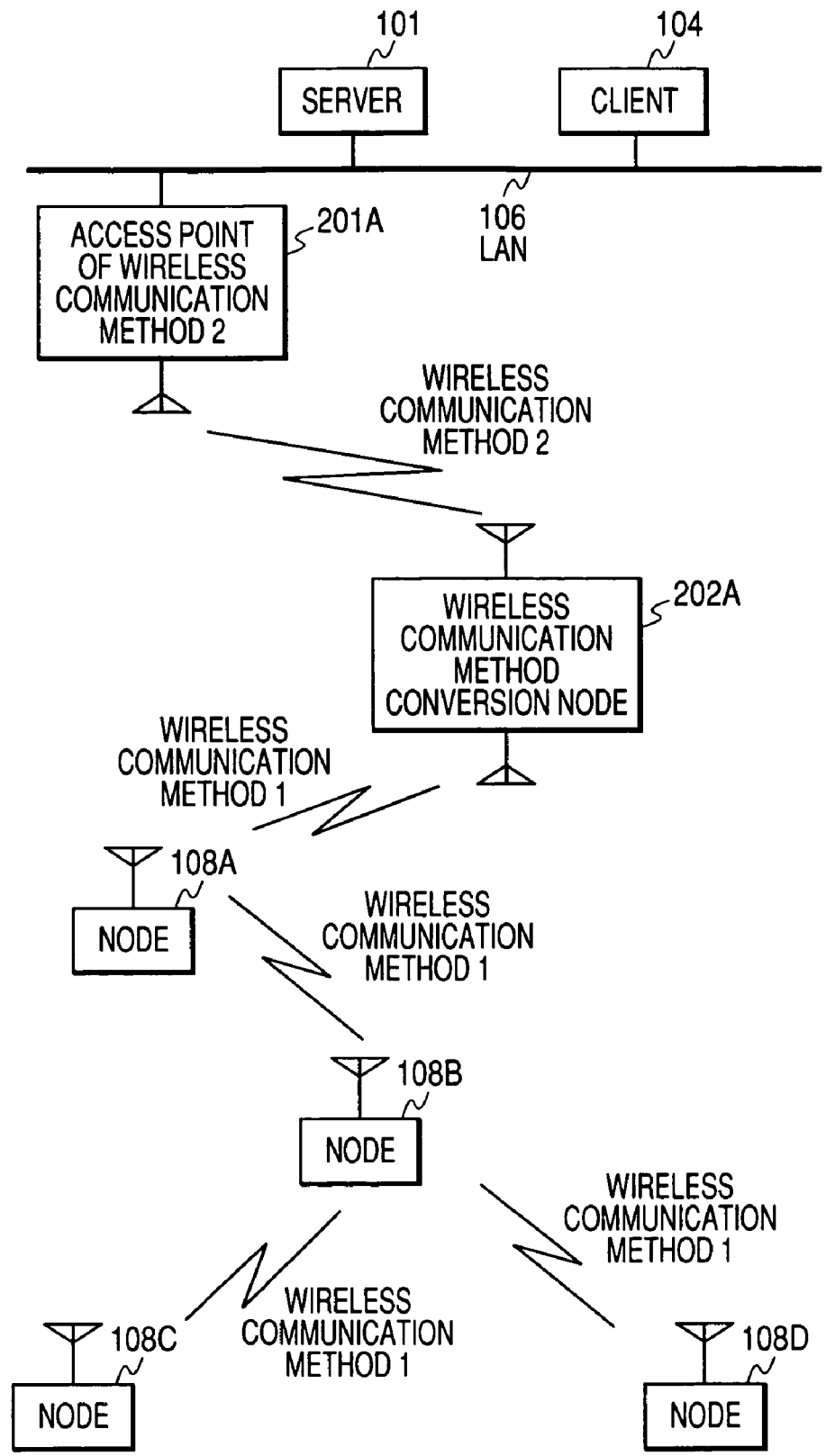
FIG. 2 is a block diagram showing a position detection system that communicates according to plural wireless communication methods according to an aspect of the present invention.

FIG. 2 is a block diagram showing a position detection system that communicates by plural wireless communication methods according to an aspect of the present invention.

The position detection system that communicates by the plural wireless communication methods includes a server 101, a client 104, an access point 201A of a wireless communication method 2, a wireless communication method conversion node 202A and nodes 108A, 108B, 108C, 108D.

The server 101, the client 104, the nodes 108A, 108B, 108C, 108D have the same configuration as those of the position detection system shown in FIG. 1 that communicates by a single wireless communication method. Therefore, the same number is allocated to the same configuration and the description is omitted.

One access point 201A of the wireless communication method 2 and one wireless communication method conversion node 202A are shown in FIG. 2, however, respective additional ones may be also provided. Four nodes 108A, 108B, 108C, 108D are shown; however, the number of nodes is not limited.

The nodes 108 communicate with each other using the wireless communication method 1. The wireless communication method conversion node 202A and the node 108A that exists in a communication range of the wireless communication method conversion node 202A communicate with each other using the wireless communication method 1. The access point 201A of the wireless communication method 2 and the wireless communication method conversion node 202A communicate with each other using the wireless communication method 2.

The access point 201A of the wireless communication method 2, the server 101 and the client 104 are mutually connected via LAN 106.

The wireless communication method conversion node 202A converts information received from the nodes 108 according to the wireless communication method 1 to information according to the wireless communication method 2 though this is described later in relation to FIG. 4. The wireless communication method conversion node sends the converted information to the access point 201A of the wireless communication method 2.

The access point 201A of the wireless communication method 2 sends information received from the wireless communication method conversion node 202A to the server 101 though this is described later in relation to FIG. 5.

The wireless communication method conversion node 202A and the access point 201A of the wireless communication method 2 communicate with each other according to the wireless communication method 2 having a larger communication range than that of the wireless communication method 1. Therefore, the position detection system that communicates by multiple wireless communication methods can reduce the number of the nodes 108 passed when information is sent from the nodes 108 to the server 101. The position detection system that communicates by multiple wireless communication methods is effective particularly in case the system is applied to a large area.

According to an aspect of the present invention, and referring to the position detection system shown in FIG. 2 which communicates by the plural wireless communication methods as an example below. However, if the access point 107 of the wireless communication method 1 is substituted for the access point 201A of the wireless communication method 2 and further, the nodes 108 are substituted for the wireless communication method conversion node 202A, the first embodiment can be also applied to the position detection system shown in FIG. 1 which communicates by the single wireless communication method.

Figure 3:
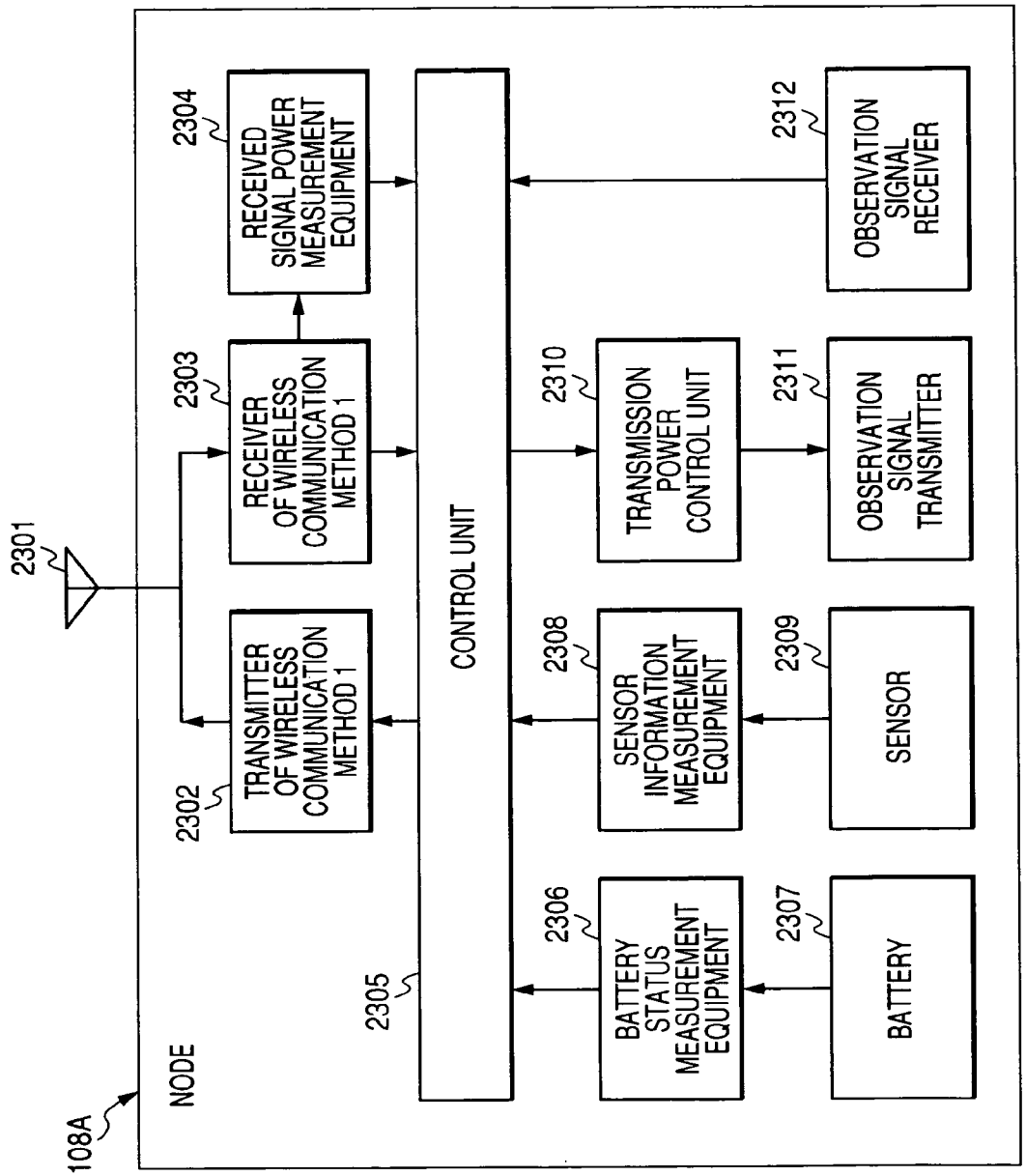
FIG. 3 is a block diagram showing a node according to an aspect of the present invention.

FIG. 3 is a block diagram showing the node 108A according to an aspect of the present invention.

The node 108A has an antenna 2301, a transmitter 2302 of the wireless communication method 1, a receiver 2303 of the wireless communication method 1, received signal power measurement equipment 2304, a control unit 2305, battery status measurement equipment 2306, a battery 2307, sensor information measurement equipment 2308, a sensor 2309, a transmission power control unit 2310, an observation signal transmitter 2311 and an observation signal receiver 2312.

The antenna 2301 transmits/receives an analog signal according to the wireless communication method 1.

The transmitter 2302 of the wireless communication method 1 converts a modulated digital signal to an analog signal according to the wireless communication method 1 after the transmitter executes an encoding process according to the wireless communication method 1 and a modulation process according to the wireless communication method 1.

The receiver 2303 of the wireless communication method 1 restores a transmitted signal by converting an analog signal according to the wireless communication method 1 received from the antenna 2301 to a digital signal and executing a demodulation process according to the wireless communication method 1 and a decoding process according to the wireless communication method 1.

The received signal power measurement equipment 2304 measures the received power of a signal according to the wireless communication method 1 received from the antenna 2301. The received signal power measurement equipment 2304 may be used according to aspects of the present invention as will be discussed hereinbelow.

The battery 2307 supplies power to the node 108A. The node 108A may be also provided with a power supply circuit in place of the battery 2307. The power supply circuit is connected to a power source outside the node 108A via a cable and power input from the outside power source is supplied to the node 108A.

The battery status measurement equipment 2306 measures the status of the battery 2307. In the status of the battery 2307, the output voltage of the battery 2307, the exchange date of the battery 2307 and/or the cumulative power consumption of the battery 2307 are included.

The sensor 2309 senses information in the circumference of the node 108A. The sensor information measurement equipment 2308 processes the information sensed by the sensor 2309. In the processing, measurement information is selected by determination based upon the mean of time, the mean of transfer and a threshold value, for example.

The control unit 2305 controls the node 108A. For example, the control unit 2305 executes the processing of a protocol for communicating with the server 101.

The observation signal transmitter 2311 transmits an observation signal outside the node 108A. The observation signal is a signal used for detecting a position of the node 108A and other nodes. The transmission power control unit 2310 controls the transmission power of an observation signal transmitted by the observation signal transmitter 2311.

The observation signal receiver 2312 receives an observation signal from a node or an access point outside the node 108A.

The configuration of another node 108B is also the same as that of the node 108A. Therefore, the description is omitted.

Figure 4:
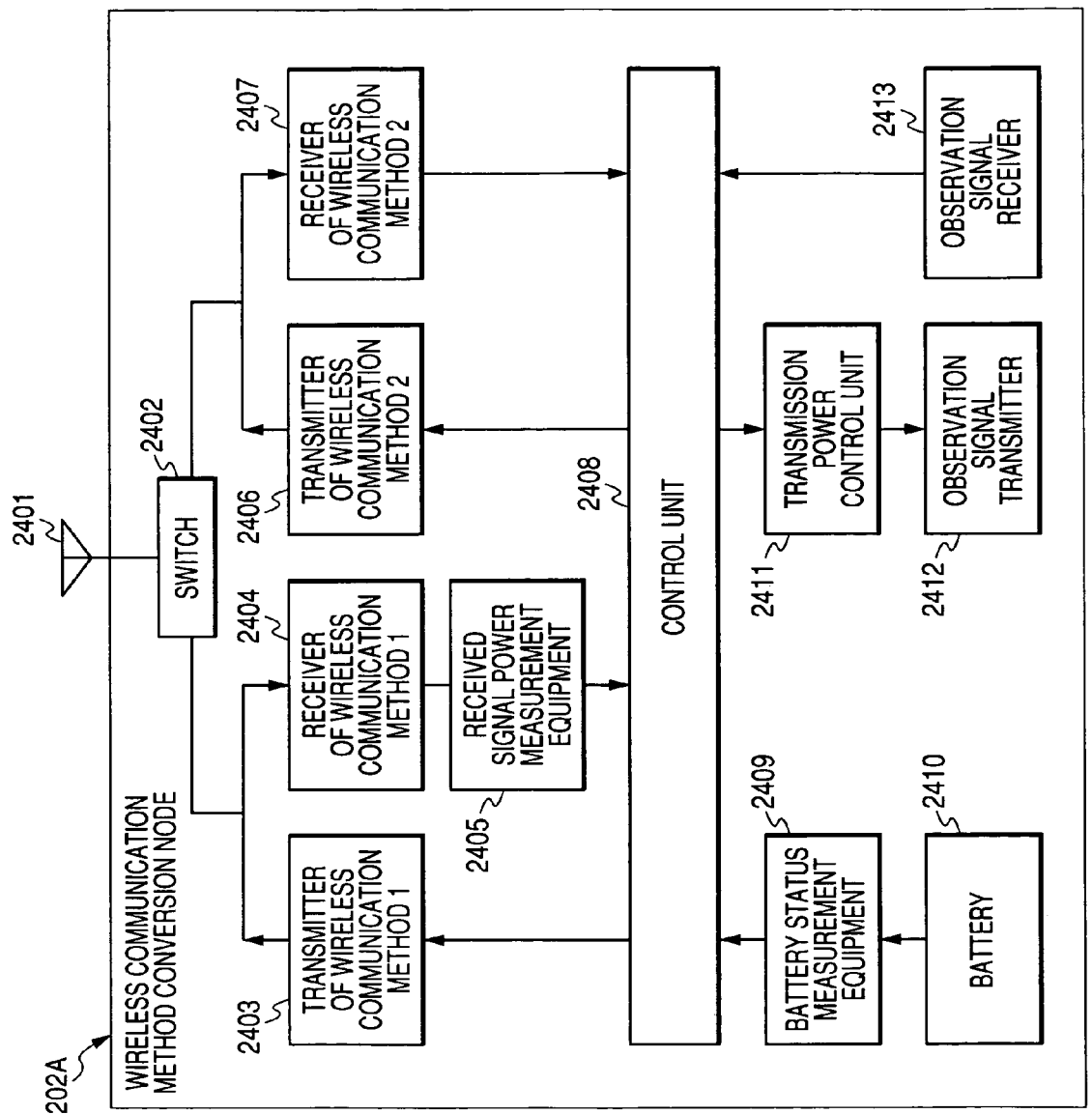
FIG. 4 is a block diagram showing a wireless communication method conversion node according to an aspect of the present invention.

FIG. 4 is a block diagram showing the wireless communication method conversion node 202A according to an aspect of the present invention.

The wireless communication method conversion node 202A has an antenna 2401, a switch 2402, a transmitter 2403 of the wireless communication method 1, a receiver 2404 of the wireless communication method 1, received signal power measurement equipment 2405, a transmitter 2406 of the wireless communication method 2, a receiver 2407 of the wireless communication method 2, a control unit 2408, battery status measurement equipment 2409, a battery 2410, a transmission power control unit 2411, an observation signal transmitter 2412 and an observation signal receiver 2413.

The antenna 2401 transmits/receives an analog signal according to the wireless communication method 1 and an analog signal according to the wireless communication method 2.

The switch 2402 switches the analog signal according to the wireless communication method 1 and the analog signal according to the wireless communication method 2.

The switch 2402 switches depending upon time, in case the wireless communication method 1 and the wireless communication method 2 utilize the same frequency band, for example. In case the wireless communication methods utilize different frequency bands, the switch discriminates them depending upon a filter.

The switch 2402 may be also omitted, by separately providing an antenna for the wireless communication method 1 and an antenna for the wireless communication method 2 as the antenna 2401.

The transmitter 2403 of the wireless communication method 1 converts a modulated digital signal to an analog signal according to the wireless communication method 1 after the transmitter executes an encoding process according to the wireless communication method 1 and a modulation process according to the wireless communication method 1.

The receiver 2404 of the wireless communication method 1 restores a transmitted signal by converting an analog signal according to the wireless communication method 1 received from the antenna 2401 to a digital signal and executing a demodulation process according to the wireless communication method 1 and a decoding process according to the wireless communication method 1.

The received signal power measurement equipment 2405 measures the received power of a signal according to the wireless communication method 1 received from the antenna 2401. The received signal power measurement equipment 2405 may be used according to an aspect of the present invention as will be discussed hereinbelow.

The transmitter 2406 of the wireless communication method 2 converts a modulated digital signal to an analog signal according to the wireless communication method 2 after the transmitter executes an encoding process according to the wireless communication method 2 and a modulation process according to the wireless communication method 2.

The receiver 2407 of the wireless communication method 2 restores a transmitted signal by converting an analog signal according to the wireless communication method 2 received from the antenna 2401 to a digital signal and executing a demodulation process according to the wireless communication method 2 and a decoding process according to the wireless communication method 2.

The battery 2410 supplies power to the wireless communication method conversion node 202A. The wireless communication method conversion node 202A may be also provided with a power supply circuit in place of the battery 2410. The power supply circuit is connected to a power source outside the wireless communication method conversion node 202A via a cable and supplies power input from the outside power source to the wireless communication method conversion node 202A.

The battery status measurement equipment 2409 measures the status of the battery 2410. The status of the battery 2410 includes the output voltage of the battery 2410, the exchange date of the battery 2410 and/or the cumulative power consumption of the battery 2410.

The observation signal transmitter 2412 transmits an observation signal outside the wireless communication method conversion node 202A. The transmission power control unit 2411 controls the transmission power of an observation signal transmitted by the observation signal transmitter 2412.

The observation signal receiver 2413 receives an observation signal from a node or an access point outside the wireless communication method conversion node 202A.

The control unit 2408 controls the whole wireless communication method conversion node 202A. For example, the control unit 2408 executes the processing of a protocol for communicating with the server 101. The control unit 2408 transfers a digital signal received from the receiver 2407 of the wireless communication method 2 to the transmitter 2403 of the wireless communication method 1 after the control unit converts the digital signal to a signal format of the wireless communication method 1. Similarly, the control unit transfers a digital signal received from the receiver 2404 of the wireless communication method 1 to the transmitter 2406 of the wireless communication method 2 after the control unit converts the digital signal to a signal format of the wireless communication method 2.

The configuration of another wireless communication method conversion node 202B and others is also the same as that of the wireless communication method conversion node 202A. Therefore, the description is omitted.

Figure 5:
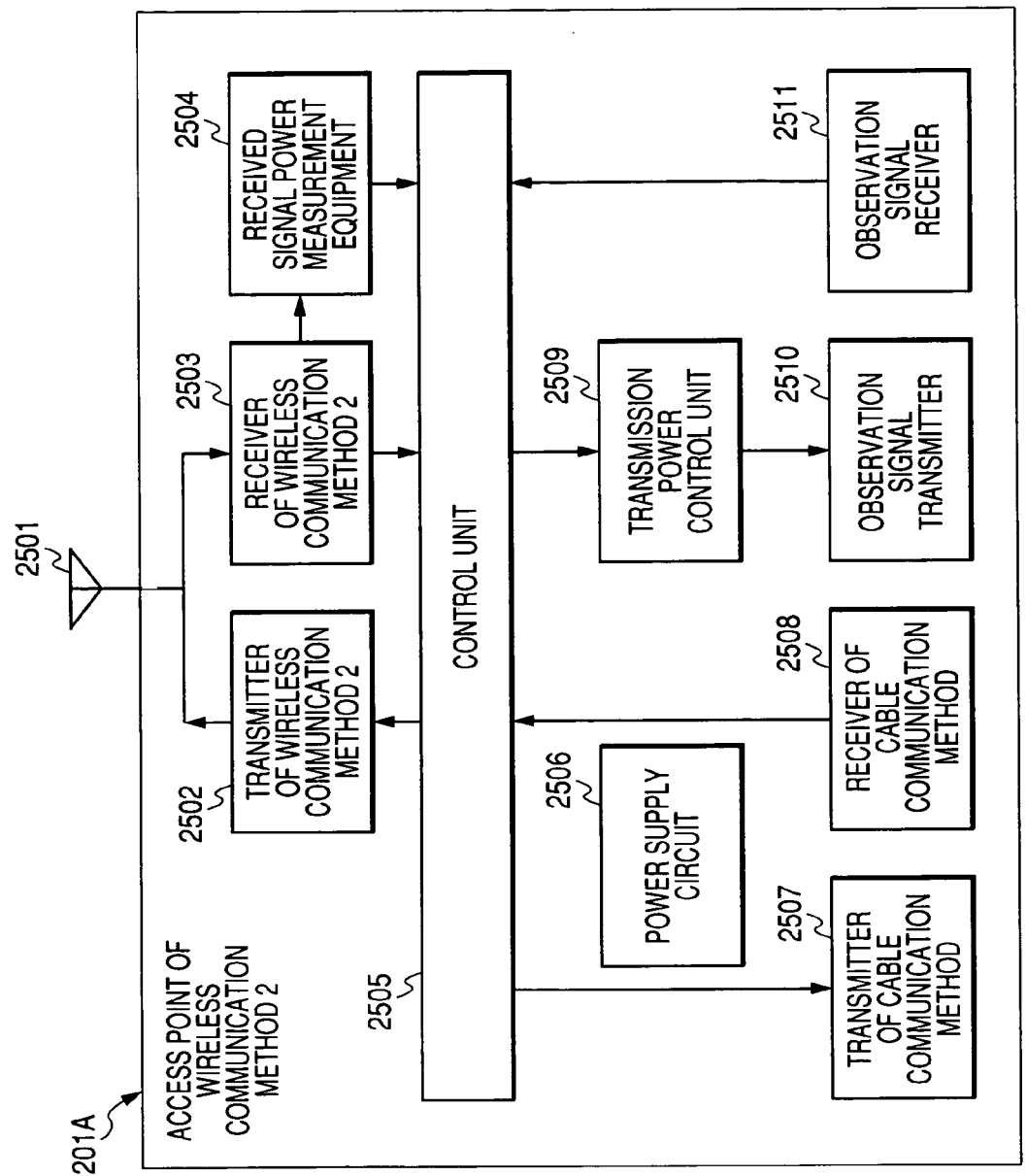
FIG. 5 is a block diagram showing an access point of a wireless communication method 2 according to an aspect of the present invention.

FIG. 5 is a block diagram showing the access point 201A of the wireless communication method 2 according to an aspect of the present invention.

The access point 201A of the wireless communication method 2 has an antenna 2501, a transmitter 2502 of the wireless communication method 2, a receiver 2503 of the wireless communication method 2, received signal power measurement equipment 2504, a control unit 2505, a power supply circuit 2506, a transmitter 2507 of a cable communication method, a receiver 2508 of the cable communication method, a transmission power control unit 2509, a transmitter 2510 of an observation signal and a receiver 2511 of an observation signal.

The antenna 2501 transmits/receives an analog signal according to the wireless communication method 2.

The transmitter 2502 of the wireless communication method 2 converts a modulated digital signal to an analog signal according to the wireless communication method 2 after the transmitter executes an encoding process according to the wireless communication method 2 and a modulation process according to the wireless communication method 2.

The receiver 2503 of the wireless communication method 2 restores a transmitted signal by converting an analog signal according to the wireless communication method 2 received from the antenna 2501 to a digital signal and executing a demodulation process according to the wireless communication method 2 and a decoding process according to the wireless communication method 2.

The received signal power measurement equipment 2504 measures the received power of a signal according to the wireless communication method 2 received from the antenna 2501. The received signal power measurement equipment 2504 may be used according to an aspect of the present invention as will be described hereinbelow.

The control unit 2505 controls the whole access point 201A of the wireless communication method 2. For example, the control unit 2505 executes the processing of a protocol for communicating with the server 101.

The power supply circuit 2506 is connected to a power source outside the access point 201A of the wireless communication method 2 via a cable and supplies power input from the outside power source to the access point 201A of the wireless communication method 2. The access point 201A of the wireless communication method 2 may be also provided with a battery in place of the power supply circuit 2506.

The transmitter 2507 of the cable communication method transmits information to the server 101 and others via LAN 106. The receiver 2508 of the cable communication method receives information from the server 101 via LAN 106.

The transmitter 2510 of an observation signal transmits an observation signal outside the access point 201A of the wireless communication method 2. The transmission power control unit 2509 controls the transmission power of an observation signal transmitted by the transmitter 2510 of an observation signal.

The receiver 2511 of an observation signal receives an observation signal from a node or an access point outside the access point 201A of the wireless communication method 2.

The configuration of another access point 201B of the wireless communication method 2 and others is also the same as that of the access point 201A of the wireless communication method 2. Therefore, the description is omitted.

Figure 6:
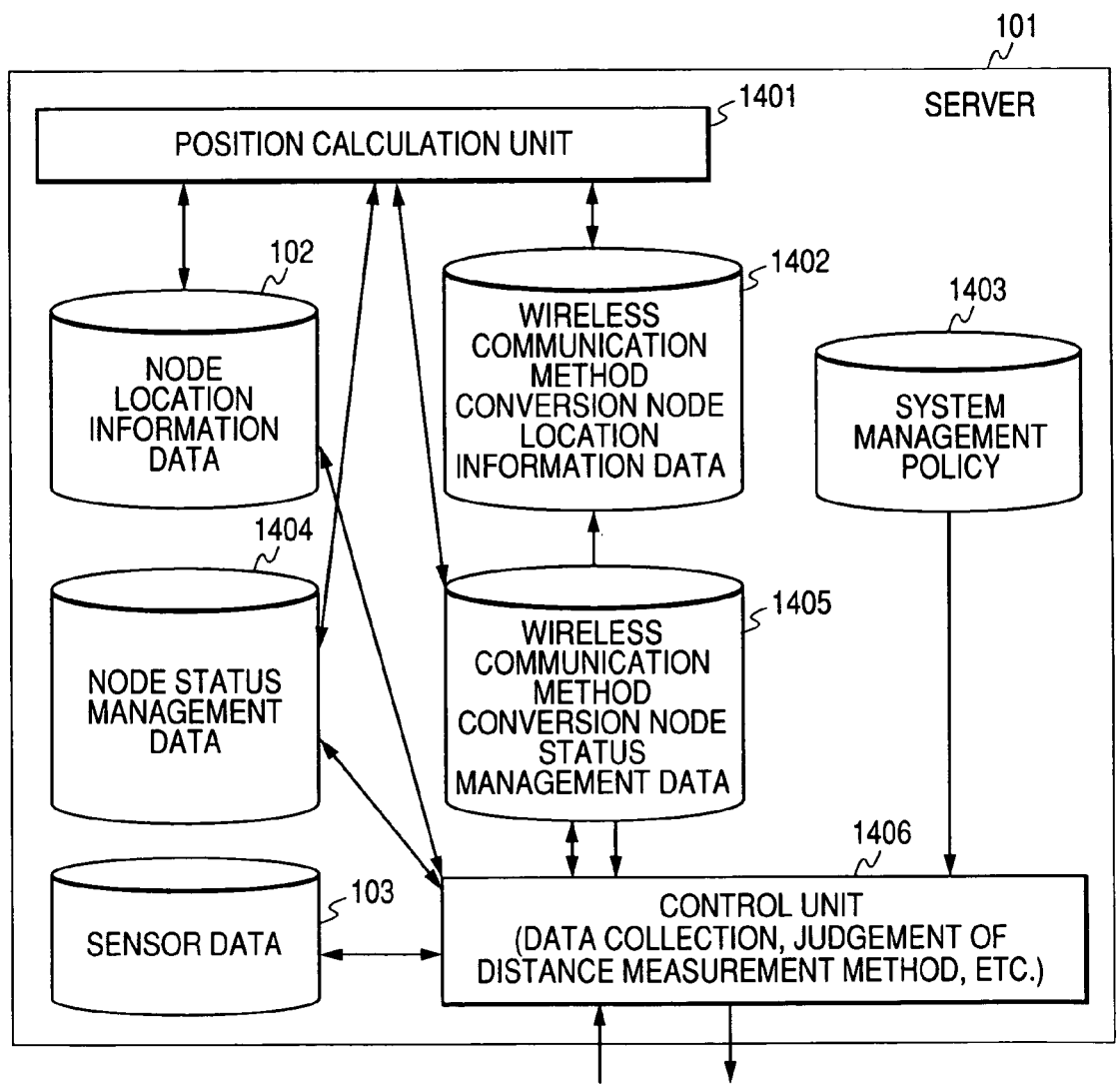
FIG. 6 is a block diagram showing a server according to an aspect of the present invention.

FIG. 6 is a block diagram showing the server 101 according to an aspect of the present invention.

The server 101 has a control unit 1406, a position calculation part 1401 and storage.

The storage stores node location information data 102, sensor data 103, wireless communication method conversion node location information data 1402, system management policy 1403, node status management data 1404 and wireless communication method conversion node status management data 1405 in each database.

The results of the position detection of the nodes 108 are stored in the node location information data 102. Information related to the status of the nodes 108 is stored in the node status management data 1404. The status of the nodes 108 includes the status of each battery 2307 of the nodes 108.

Information measured by each sensor 2309 of the nodes 108 is stored in the sensor data 103.

The results of the position detection of the wireless communication method conversion nodes 202 are stored in the wireless communication method conversion node location information data 1402.

Information related to the status of the wireless communication method conversion nodes 202 is stored in the wireless communication method conversion node status management data 1405. The status of each battery 2410 of the wireless communication method conversion nodes 202 is included in the status of the wireless communication method conversion nodes 202.

The policy for determining a method of detecting positions of the nodes 108 and the wireless communication method conversion nodes 202 is stored in the system management policy 1403.

The control unit 1406 controls the whole server 101. For example, the control unit 1406 executes the processing of a protocol for communicating with the node 108A and others, the wireless communication method conversion nodes 202, the access point 201A of the wireless communication method 2. Besides, the control unit 1406 stores information received from the nodes 108, the wireless communication method conversion nodes 202 and the access point 201A of the wireless communication method 2 in the storage. Besides, the control unit 1406 determines a method of detecting positions of the nodes 108, the wireless communication method conversion nodes 202A based upon the system management policy 1403.

The position calculation part 1401 calculates positions of the nodes 108 based upon information received from the nodes 108, the wireless communication method conversion nodes 202. Similarly, the position calculation part 1401 calculates positions of the wireless communication method conversion nodes 202 based upon information received from the wireless communication method conversion nodes 202, the access point 201A of the wireless communication method 2.

A method of calculating the positions of the wireless communication method conversion nodes 202 and the nodes 108 will be described below.

Figure 7A:
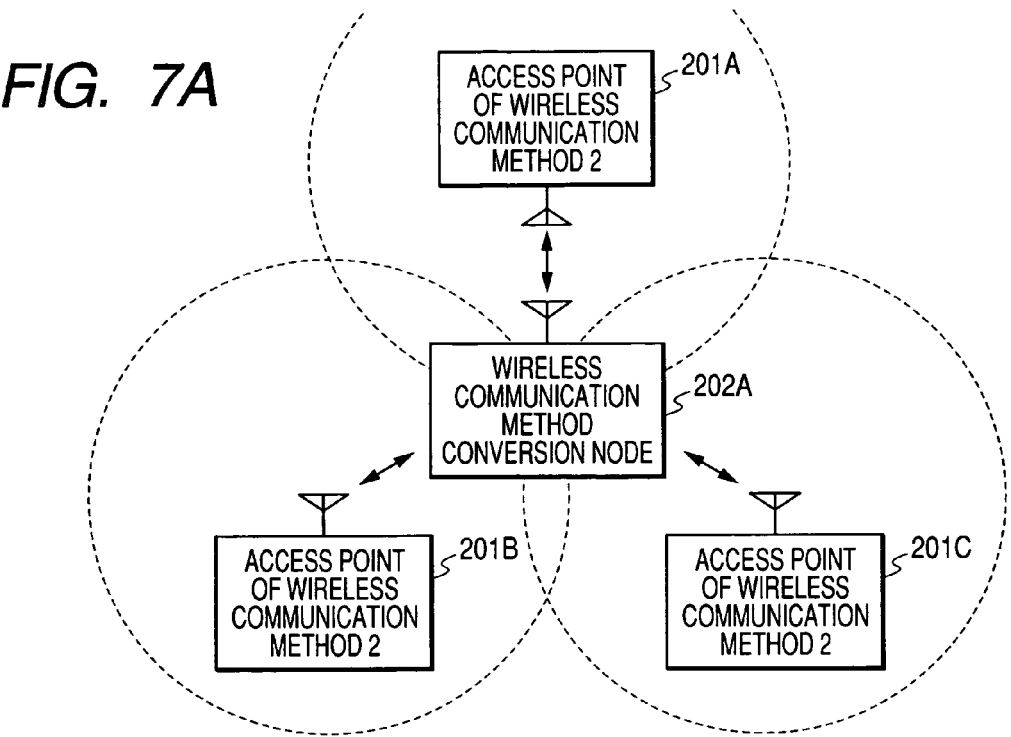
FIG. 7A is an explanatory drawing for explaining a position calculation method 1 according to an aspect of the present invention and FIG. 7B is an explanatory drawing for explaining the position calculation method 1 according to an aspect of the present invention.

FIG. 7A is an explanatory drawing for explaining a position calculation method 1 according to an aspect of the present invention.

The server 101 calculates the positions of the wireless communication method conversion nodes 202 using the position calculation method 1.

This explanatory drawing shows a case that the wireless communication method conversion node 202A is an object of position detection.

First, the server 101 determines a method of detecting a position of the wireless communication method conversion node 202A (described later in relation to FIGS. 11 to 15). Next, distance between the wireless communication method conversion node 202A and each access point 201A, 201B, 201C of the wireless communication method 2 is measured according to the determined position detection method.

Next, the server calculates the position of the wireless communication method conversion node 202A by applying a principle of trilateration to the measured each distance.

However, the server 101 stores positions of the access point 201A of the wireless communication method 2 beforehand.

The positions of the access point 201A of the wireless communication method 2 may be also detected in installation and may be also detected at predetermined timing by GPS.

Figure 7B:
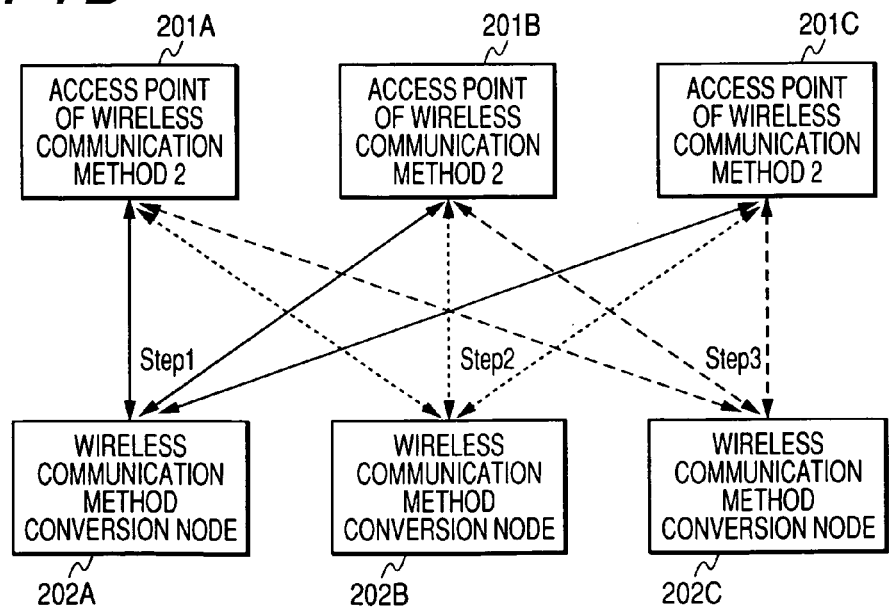

FIG. 7B is an explanatory drawing for explaining the position calculation method 1 according to an aspect of the present invention.

This explanatory drawing shows a case that the wireless communication method conversion nodes 202A, 202B and 202C are objects of position detection.

First, the server 101 obtains distance between the wireless communication method conversion node 202A and each access point 201A, 201B, 201C of the wireless communication method 2. Next, the server calculates the position of the wireless communication method conversion node 202A by applying the principle of trilateration to the measured each distance (a step 1).

Similarly, the server obtains distance between the wireless communication method conversion node 202B and each access point 201A, 201B, 201C of the wireless communication method 2. Next, the server calculates the position of the wireless communication method conversion node 202B by applying the principle of trilateration to the measured each distance (a step 2).

Further, the server obtains distance between the wireless communication method conversion node 202C and each access point 201A, 201B, 201C of the wireless communication method 2. Next, the server calculates the position of the wireless communication method conversion node 202C by applying the principle of trilateration to the measured each distance (a step 3).

The server 101 can calculate the positions of all the wireless communication method conversion nodes 202 by repeating such processes.

In the position calculation method 1, each wireless communication method conversion nodes 202 which is the object of position detection is required to be able to constantly communicate with three or more access points 201 of the wireless communication method 2. Therefore, the position calculation method 1 is effective in case communication distance is long in the wireless communication method 2.

The server 101 can also calculate the positions of the nodes 108 using the position calculation method 1. In this case, the wireless communication method conversion nodes 202 are substituted for the access point 201A of the wireless communication method 2 and further, the nodes 108 are substituted for the wireless communication method conversion nodes 202.

Figure 8A:
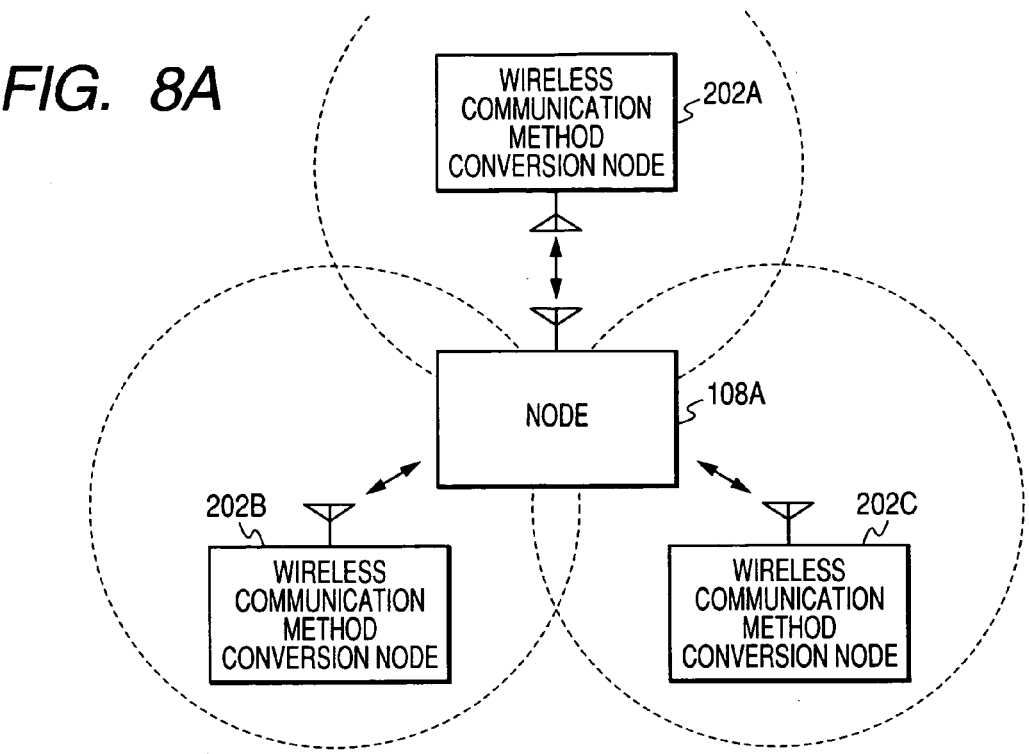
FIG. 8A is an explanatory drawing for explaining a position calculation method 2 according to an aspect of the present invention and FIG. 8B is an explanatory drawing for explaining the position calculation method 2 according to an aspect of the present invention.

FIG. 8A is an explanatory drawing for explaining a position calculation method 2 according to an aspect of the present invention.

The server 101 calculates the positions of the nodes 108 using the position calculation method 2.

This explanatory drawing shows a case that the node 108A is an object of position detection.

First, the server 101 determines a method of detecting the position of the node 108A (described later in relation to FIGS. 11 to 15). Next, distance between the node 108A and each wireless communication method conversion node 202A, 202B, 202C is measured according to the determined position detection method.

Next, the server calculates the position of the node 108A by applying the principle of trilateration to the measured each distance.

However, the server 101 obtains the positions of the wireless communication method conversion nodes 202 according to the above-mentioned position calculation method 1 beforehand.

Figure 8B:
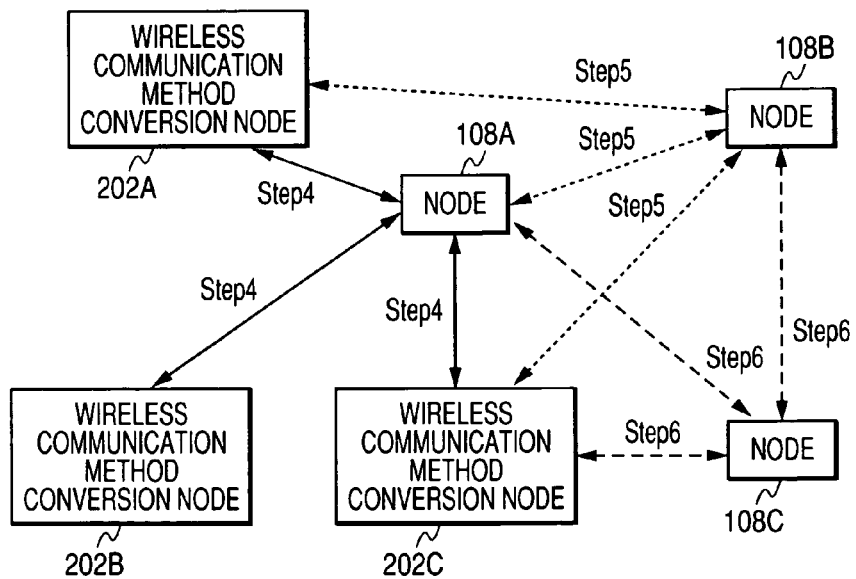

FIG. 8B is an explanatory drawing for explaining the position calculation method 2 according to an aspect of the present invention.

First, the server 101 obtains distance between the node 108A and each wireless communication method conversion node 202A, 202B, 202C. Next, the server calculates the position of the node 108A by applying the principle of trilateration to the measured each distance (a step 4).

Next, the server obtains distance between the node 108B and the node 108A and distance between the node 108B and each wireless communication method conversion node 202A, 202C. Next, the server calculates the position of the node 108B by applying the principle of trilateration to the measured each distance (a step 5). The server 101 can calculate the position of the node 108B because the server calculates the position of the node 108A in the step 4.

Next, the server obtains distance between the node 108C and each node 108A, 108B and distance between the node 108C and the wireless communication method conversion node 202C. Next, the server calculates the position of the node 108C by applying the principle of trilateration to the measured each distance (a step 6). The server 101 can calculate the position of the node 108C because the server calculates the position of the node 108A in the step 4 and the position of the node 108B in the step 5.

The server 101 can calculate the positions of all nodes 108 and others by repeating such processes.

The server 101 calculates the positions of the nodes 108 that can communicate with three or more wireless communication method conversion nodes 202. The server calculates the positions of all the nodes 108 utilizing the calculated positions of the nodes 108.

In the position calculation method 2, the node 108 are not required to be able to communicate with three or more wireless communication method conversion nodes 202. Therefore, the position calculation method 2 is effective in case communication distance is short in the wireless communication method 1.

The server 101 can also calculate the positions of the wireless communication method conversion nodes 202 using the position calculation method 2. In this case, the access points 201 of the wireless communication method 2 are substituted for the wireless communication method conversion nodes 202 and further, the wireless communication method conversion nodes 202 are substituted for the nodes 108.

Figure 9:
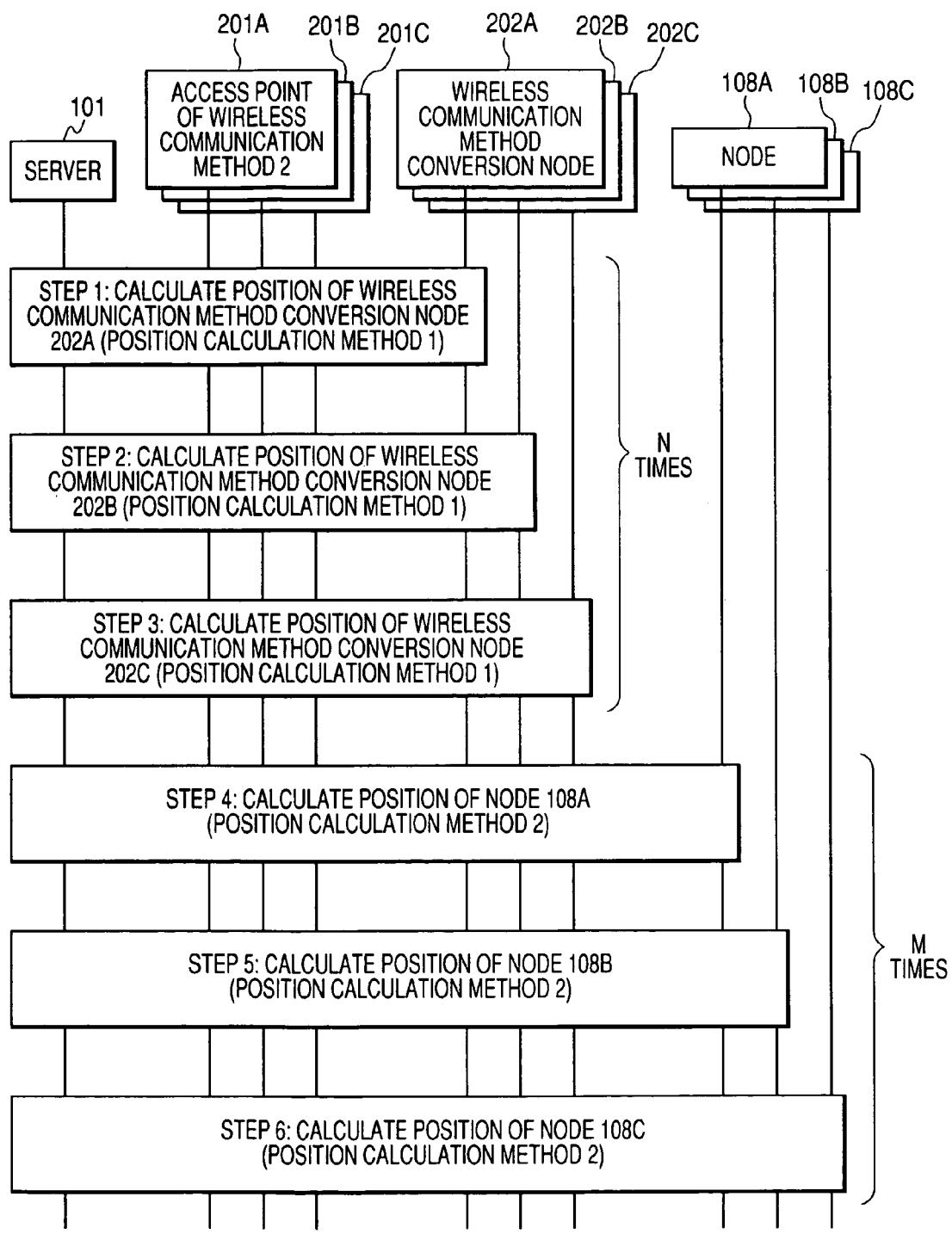
FIG. 9 is a flowchart showing a node position calculation process by the server in the embodiment of the invention.

FIG. 9 is a flowchart showing a node position calculation process by the server 101 in the embodiment of the invention.

First, the server 101 calculates the position of the wireless communication method conversion node 202A according to the above-mentioned position calculation method 1 (a step 1). Similarly, the server calculates the position of the wireless communication method conversion node 202B according to the position calculation method 1 (a step 2). Similarly, the server calculates the position of the wireless communication method conversion node 202C according to the position calculation method 1 (a step 3).

The server 101 repeats the process from the step 1 to the step 3 by a predetermined frequency (for example, N times).

The server 101 obtains the respective positions of the wireless communication method conversion nodes 202 based upon the positions calculated in the processing of N times. For example, the server sets an average value of each position calculated in the processing of N times as the respective positions of the wireless communication method conversion nodes 202.

Next, the server calculates the position of the node 108A according to the above-mentioned position calculation method 2 (a step 4). At this time, the server utilizes the calculated positions of the wireless communication method conversion nodes 202. Next, the server calculates the position of the node 108B according to the position calculation method 2 (a step 5). Next, the server calculates the position of the node 108C according to the position calculation method 2 (a step 6).

The server 101 repeats the process from the step 4 to the step 6 by a predetermined frequency (for example, M times).

The server 101 obtains the respective positions of the nodes 108 based upon the positions calculated in the processing of M times. For example, the server sets an average value of each position calculated in the processing of M times as the respective positions of the nodes 108.

The server 101 calculates the positions of all the wireless communication method conversion nodes 202 and all the nodes 108 as described above.

However, the server 101 cannot calculate the position of the other node 108A or 202A when the server can calculate only the position of either of the node 108A or the wireless communication method conversion node 202A. The reason will be described in relation to FIG. 10 below.

Figure 10:
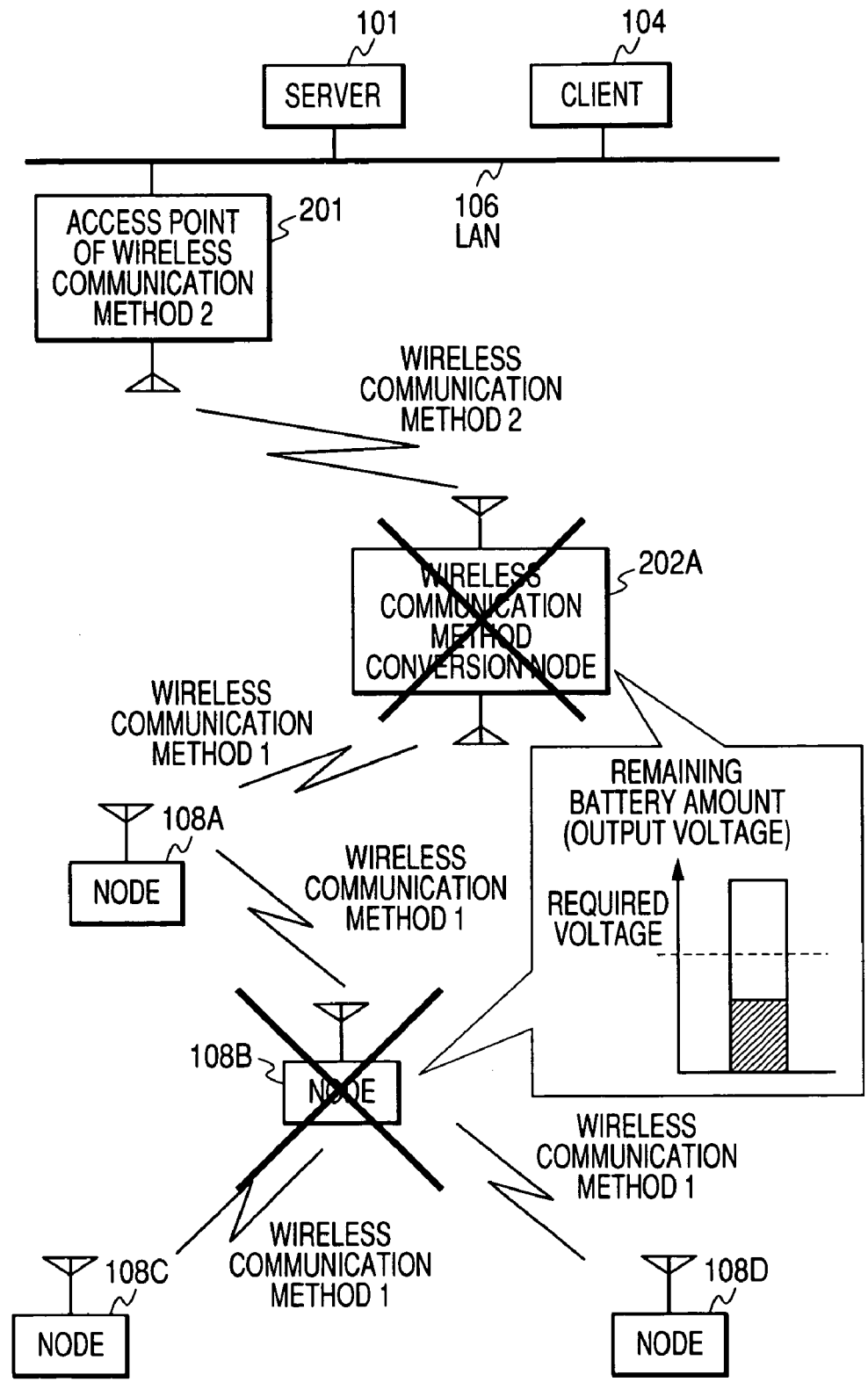
FIG. 10 is an explanatory drawing for explaining a problem of the node position calculation process by the server according to an aspect of the present invention.

FIG. 10 is an explanatory drawing for explaining a problem of the node position calculation process by the server 101 according to an aspect of the present invention.

For example, a case that the output voltage of the battery 2410 of the wireless communication method conversion node 202A is lower than voltage required for operation will be described below. In this case, the server 101 cannot calculate the position of the wireless communication method conversion node 202A.

Then, as the server 101 cannot obtain the position of the wireless communication method conversion node 202A, it cannot also calculate the position of the node 108A. Further, as the server 101 cannot obtain each position of the wireless communication method conversion node 202A and the node 108A, it cannot also calculate the positions of the nodes 108B, 108C and 108D as a result.

As described above, when the residual amount of the battery 2410 of the wireless communication method conversion node 202A is less than a threshold value, the server 101 can calculate neither the position of the corresponding wireless communication method conversion node 202A nor the positions of the nodes 108.

Next, a case that the output voltage of the battery 2307 of the node 108B is less than voltage required for the operation will be described. In this case, the server 101 cannot calculate the position of the node 108B.

Then, as the server 101 cannot obtain the position of the node 108B, it cannot also calculate the positions of the nodes 108C and 108D.

As described above, when the residual amount of the battery 2307 of the node 108B is less than a threshold value, the server 101 can calculate neither the position of the corresponding node 108B nor the positions of the nodes 108C and 108D subordinated to the node 108B.

The power consumption of the battery 2410 of the wireless communication method conversion node 202A and each battery 2307 of the nodes 108 are different depending upon a position detection method.

Five position detection methods will be described below. A case where the wireless communication method conversion node 202A is an object of position detection will be described as an example below. However, the server 101 can detect the position of the node 108A by substituting the wireless communication method conversion nodes 202 for the access points 201 of the wireless communication method 2 and further, substituting the node 108A for the wireless communication method conversion node 202A.

Figure 11A:
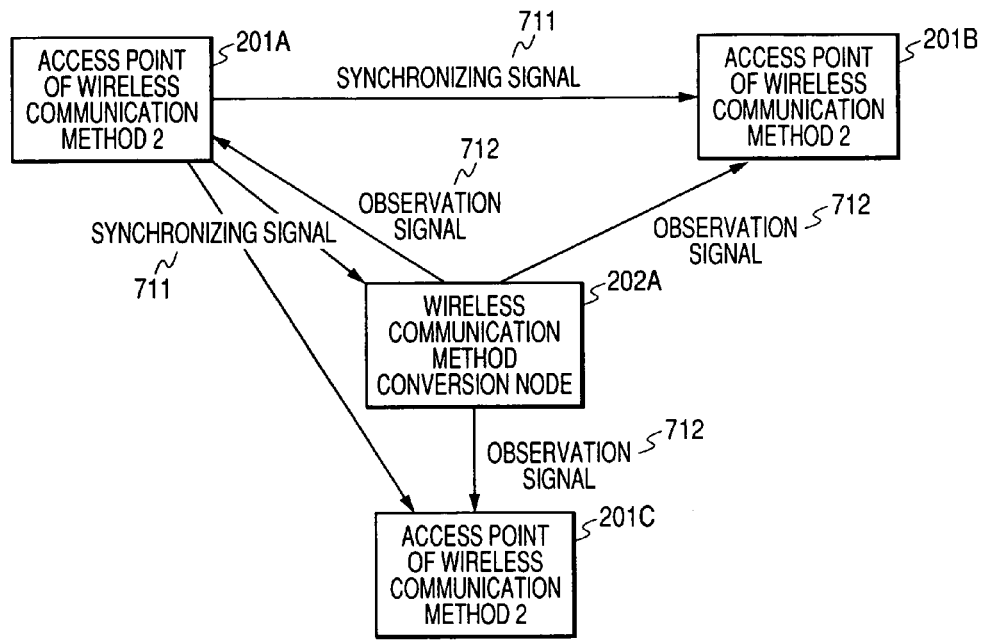
FIG. 11A is an explanatory drawing for explaining a position detection method 1 according to an aspect of the present invention and FIG. 11B is a sequence diagram showing the position detection method 1 according to an aspect of the present invention.
Figure 11B:
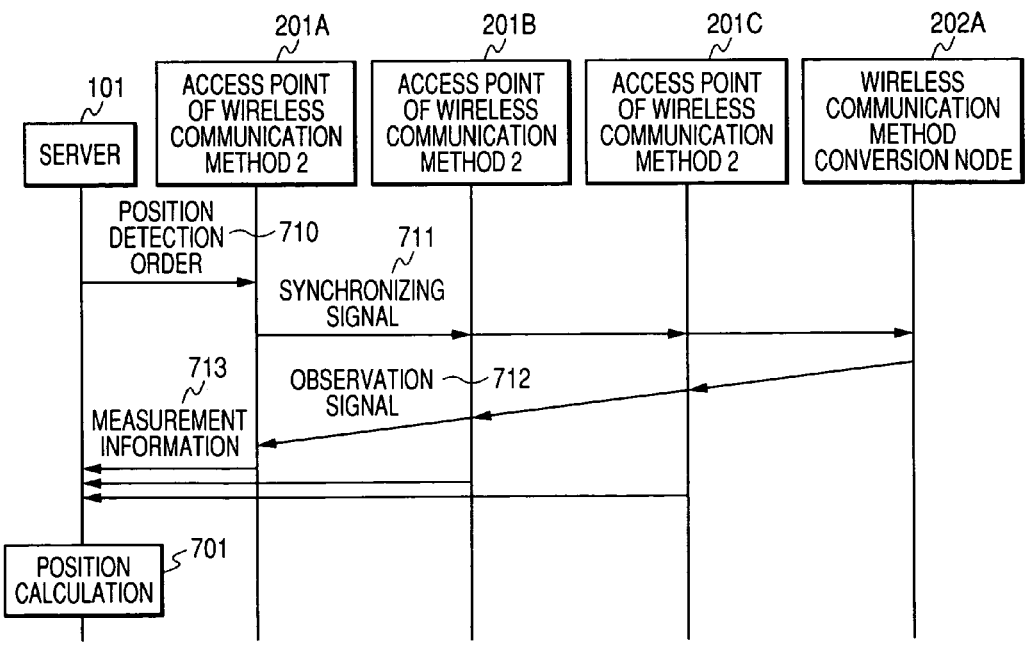

FIG. 11A is an explanatory drawing for explaining a position detection method 1 according to an aspect of the present invention. FIG. 11B is a sequence diagram showing the position detection method 1 according to an aspect of the present invention.

First, the server 101 sends a position detection order 710 to the access point 201A of the wireless communication method 2.

When the access point 201A of the wireless communication method 2 receives the position detection order 710, it sends a synchronizing signal 711. At this time, the access point 201A of the wireless communication method 2 checks time at which the synchronizing signal 711 is sent and stores the time. The synchronizing signal 711 is a signal according to the wireless communication method 2 and includes a unique identifier of the transmitter.

Then, the access points 201B and 201C of the wireless communication method 2 and the wireless communication method conversion node 202A receive the synchronizing signal 711 from the access point 201A of the wireless communication method 2. At this time, the access points 201B and 201C of the wireless communication method 2 check the time at which the synchronizing signal 711 is received and store the time.

In the meantime, the wireless communication method conversion node 202A sends an observation signal 712 in response to the receipt of the synchronizing signal 711. The observation signal 712 may be a radio signal, a sound wave or an ultrasonic signal and includes a unique identifier of the transmitter.

Then, the access points 201A, 201B and 201C of the wireless communication method 2 receive the observation signal 712. The access points 201 each check the time at which the observation signal 712 is received and store the time.

Next, the access point 201A of the wireless communication method 2 obtains time difference between the synchronizing signal 711 and the observation signal 712 by subtracting time at which the synchronizing signal 711 is sent from the stored time at which the observation signal 712 is received. The access points 201B and 201C of the wireless communication method 2 obtain time difference between the synchronizing signal 711 and the observation signal 712 by subtracting time at which the synchronizing signal 711 is received from the stored time at which the observation signal 712 is received.

The access points 201A, 201B and 201C of the wireless communication method 2 send the obtained time difference between the synchronizing signal 711 and the observation signal 712 to the server 101 as measurement information 713.

The server 101 receives the measurement information 713 from the access points 201A, 201B and 201C of the wireless communication method 2. The server calculates the position of the wireless communication method conversion node 202A based upon the received measurement information 713 (701).

Figure 12A:
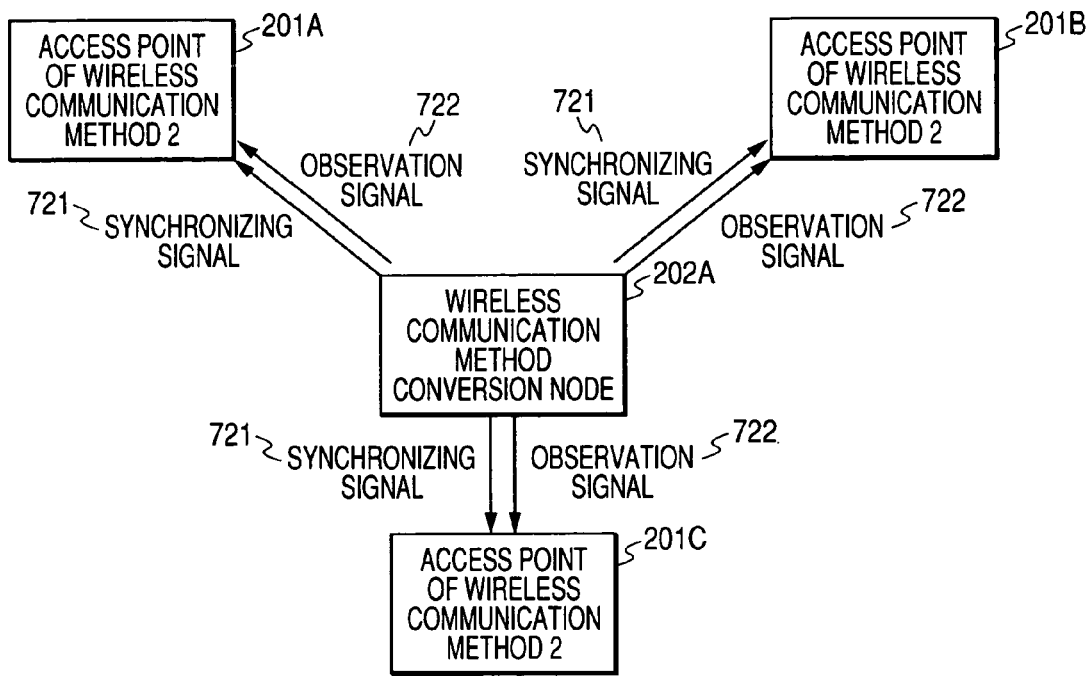
FIG. 12A is an explanatory drawing for explaining a position detection method 2 according to an aspect of the present invention and FIG. 12B is a sequence diagram showing the position detection method 2 according to an aspect of the present invention.
Figure 12B:
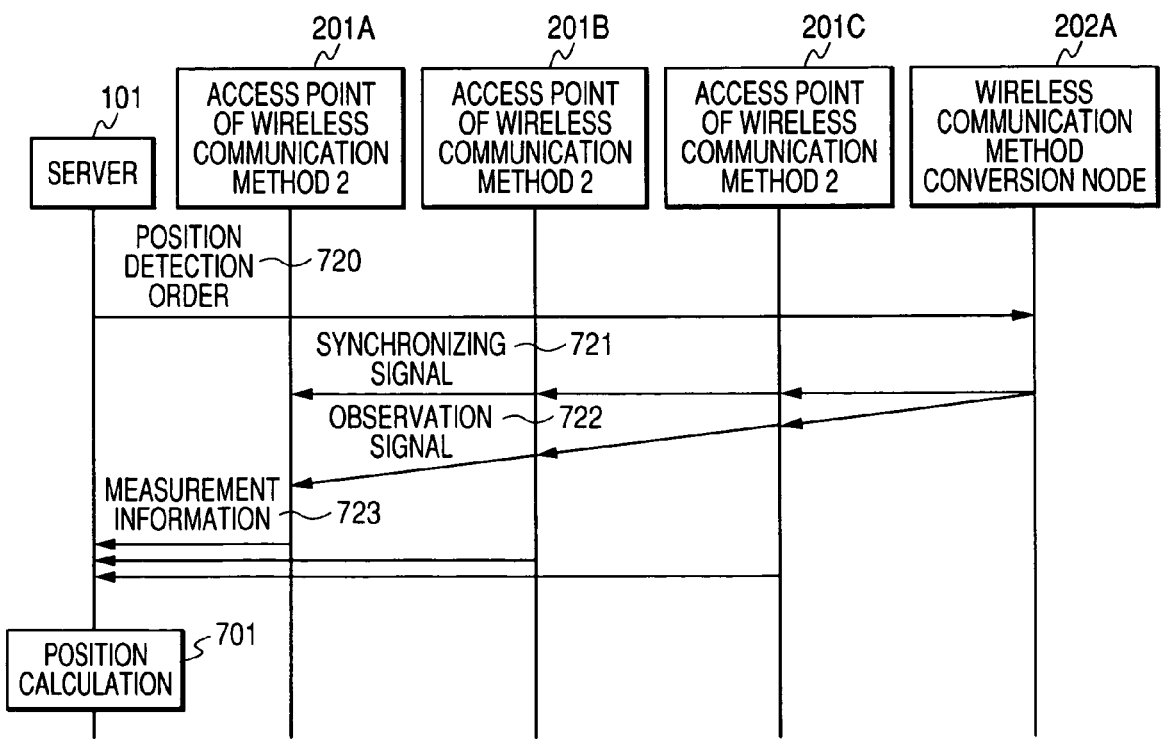

FIG. 12A is an explanatory drawing for explaining a position detection method 2 according to an aspect of the present invention. FIG. 12B is a sequence diagram showing the position detection method 2 according to an aspect of the present invention.

First, the server 101 sends a position detection order 720 to the wireless communication method conversion node 202A via the access point 201A of the wireless communication method 2.

The wireless communication method conversion node 202A simultaneously sends a synchronizing signal 721 and an observation signal 722 when the node receives the position detection order 720. The synchronizing signal 721 is a signal according to the wireless communication method 2 and includes a unique identifier of the transmitter. The observation signal 722 is a radio signal, a sound wave or an ultrasonic signal and includes a unique identifier of the transmitter.

Then, the access points 201A, 201B and 201C of the wireless communication method 2 receive the synchronizing signal 721 and the observation signal 722. At this time, the access points 201A, 201B and 201C of the wireless communication method 2 each check the time at which the synchronizing signal 721 is received and time at which the observation signal 722 is received and store the time.

Next, the access points 201A, 201B and 201C of the wireless communication method 2 obtain time difference between the synchronizing signal 721 and the observation signal 722 by subtracting the time at which the synchronizing signal 721 is received from the stored time at which the observation signal 722 is received. The access points 201 send the obtained time difference between the synchronizing signal 721 and the observation signal 722 to the server 101 as measurement information 723.

The server 101 receives the measurement information 723 from the access points 201A, 201B and 201C of the wireless communication method 2. The server calculates a position of the wireless communication method conversion node 202A based upon the received measurement information 723 (701).

Figure 13A:
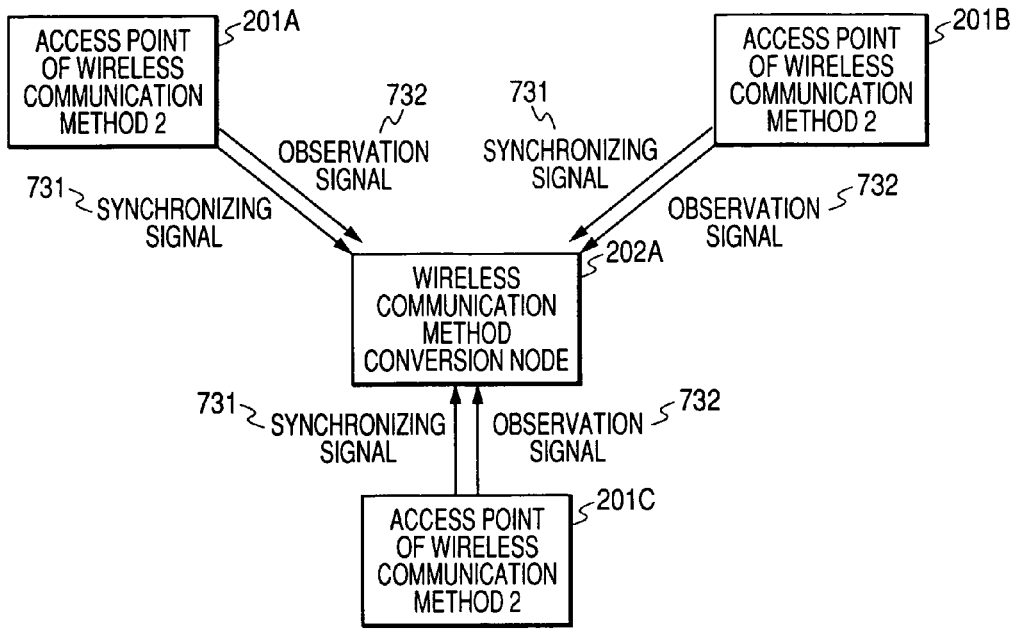
FIG. 13A is an explanatory drawing for explaining a position detection method 3 according to an aspect of the present invention and FIG. 13B is a sequence diagram showing the position detection method 3 according to an aspect of the present invention.
Figure 13B:
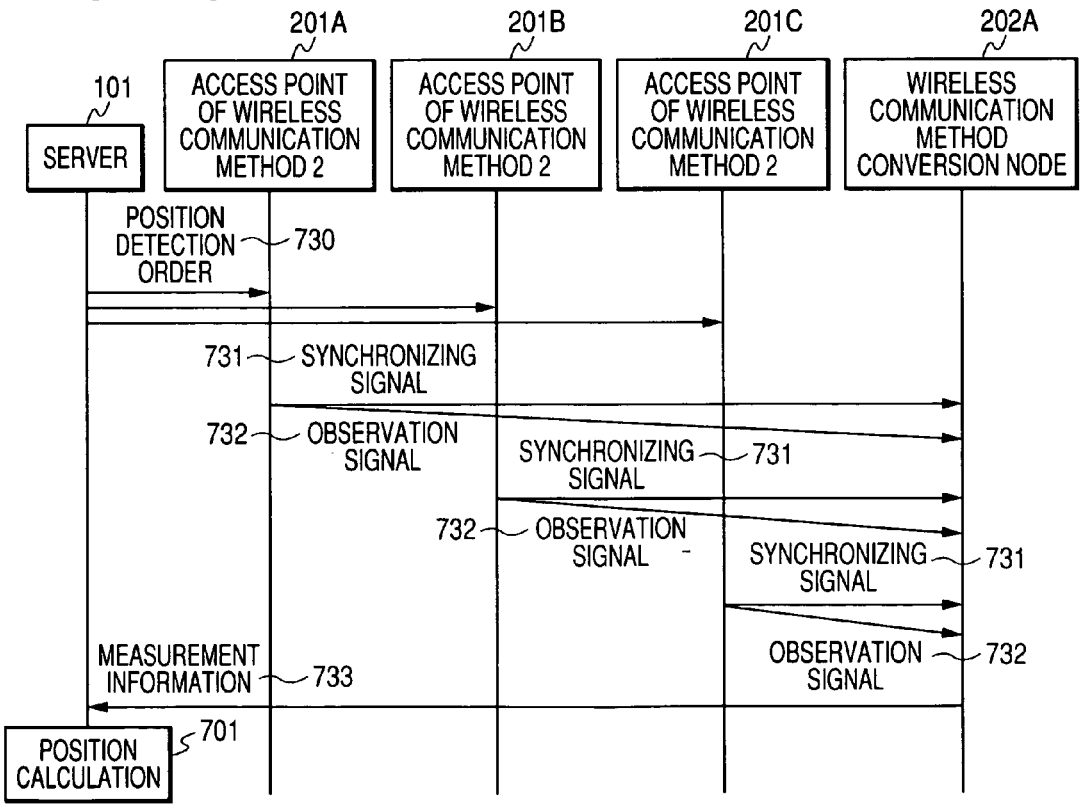

FIG. 13A is an explanatory drawing for explaining a position detection method 3 according to an aspect of the present invention. FIG. 13B is a sequence diagram showing the position detection method 3 according to an aspect of the present invention.

First, the server 101 sends a position detection order 730 to the access points 201A, 201B and 201C of the wireless communication method 2. The position detection order 730 includes the send timing of a synchronizing signal 731 and an observation signal 732. The send timing may be also the same in all the access points 201A, 201B and 201C and may be also different for every access point 201A, 201B, 201C.

The access points 201A, 201B and 201C of the wireless communication method 2 each simultaneously send the synchronizing signal 731 and the observation signal 732 at send timing included in the position detection order 730. The synchronizing signal 731 is a signal according to the wireless communication method 2 and includes a unique identifier of the transmitter. The observation signal 732 is a radio signal, a sound wave or an ultrasonic signal and includes a unique identifier of the transmitter.

The wireless communication method conversion node 202A receives the synchronizing signal 731 and the observation signal 732 from the access points 201A, 201B and 201C of the wireless communication method 2. At this time, the wireless communication method conversion node 202A checks the time at which the synchronizing signal 731 is received and time at which the observation signal 732 is received and stores the time.

Next, the wireless communication method conversion node 202A obtains time difference between the synchronizing signal 731 and the observation signal 732 by subtracting the time at which the synchronizing signal 731 is received from the stored time at which the observation signal 732 is received. The wireless communication method conversion node 202A calculates time difference with the access points 201A, 201B and 201C of the wireless communication method 2.

The wireless communication method conversion node 202A sends the obtained time difference between the synchronizing signal 731 and the observation signal 732 to the server 101 as measurement information 733.

The server 101 receives the measurement information 733 from the wireless communication method conversion node 202A. The server calculates a position of the wireless communication method conversion node 202A based upon the received measurement information 733 (701).

Figure 14A:
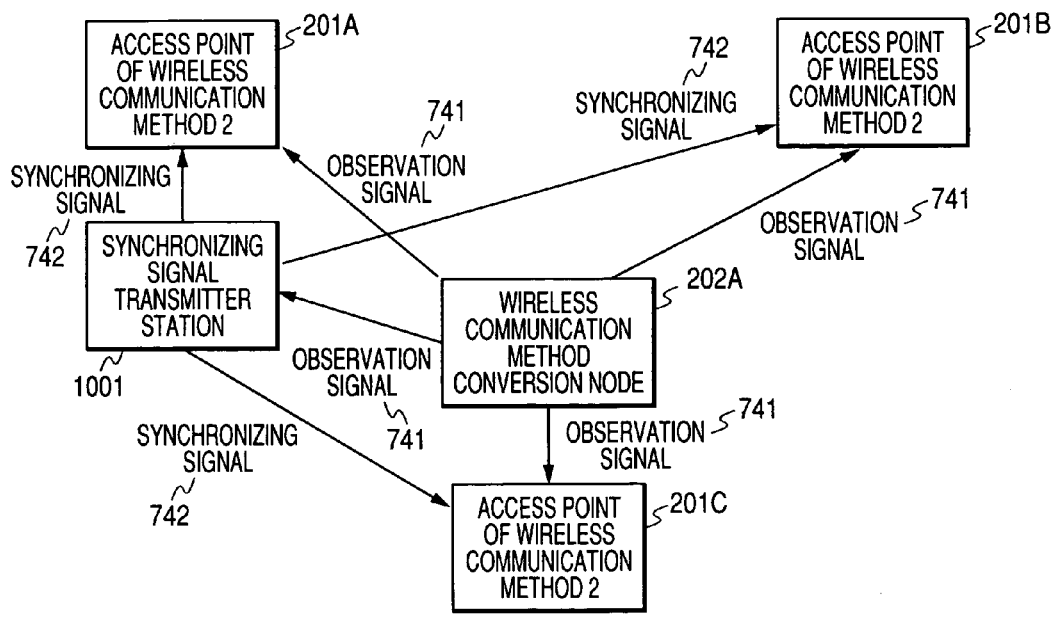
FIG. 14A is an explanatory drawing for explaining a position detection method 4 according to an aspect of the present invention and FIG. 14B is a sequence diagram showing the position detection method 4 according to an aspect of the present invention.
Figure 14B:
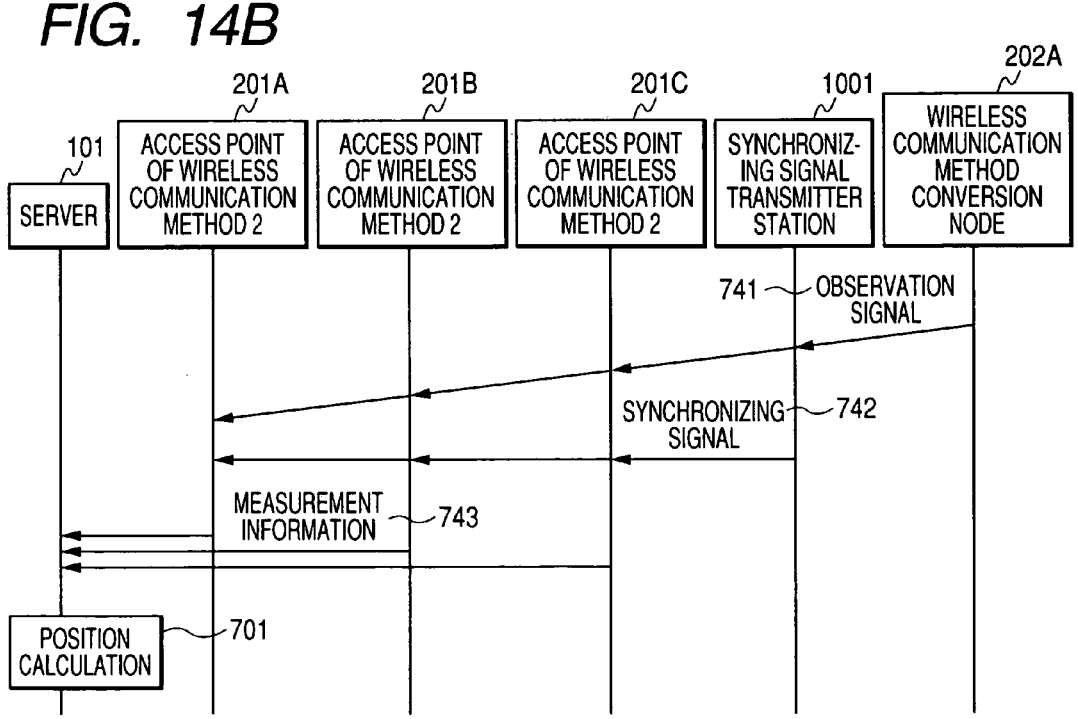

FIG. 14A is an explanatory drawing for explaining a position detection method 4 according to an aspect of the present invention. FIG. 14B is a sequence diagram showing the position detection method 4 according to an aspect of the present invention.

The server 101 executes the position detection method 4, the position detection system in the embodiment shown in FIG. 1 is provided with a synchronizing signal transmitter station 1001. The synchronizing signal transmitter station 1001 sends a synchronizing signal when it receives an observation signal.

The processing of the position detection method 4 will be described below.

First, the wireless communication method conversion node 202A sends an observation signal 741 at a preset cycle. The observation signal 741 is a radio signal, a sound wave or an ultrasonic signal and includes a unique identifier of the transmitter.

Then, the access points 201A, 201B, 201C of the wireless communication method 2 and the synchronizing signal transmitter station 1001 receive the observation signal 741. At this time, the access points 201A, 201B and 201C of the wireless communication method 2 check time at which the observation signal 741 is received and store the time. In the meantime, the synchronizing signal transmitter station 1001 sends the synchronizing signal 742 when it receives the observation signal 741. The synchronizing signal 742 is a signal according to the wireless communication method 2 and includes a unique identifier of the transmitter.

Then, the access points 201A, 201B and 201C of the wireless communication method 2 receive the synchronizing signal 742 from the synchronizing signal transmitter station 1001. At this time, the access points 201A, 201B and 201C of the wireless communication method 2 check time at which the synchronizing signal 742 is received and store the time.

Next, the access points 201A, 201B and 201C of the wireless communication method 2 obtain time difference between the synchronizing signal 742 and the observation signal 741 by subtracting the time at which the observation signal 741 is received from the stored time at which the synchronizing signal 742 is received. They send the obtained time difference between the synchronizing signal 742 and the observation signal 741 to the server 101 as measurement information 743.

The server 101 receives the measurement information 743 from the access points 201A, 201B and 201C of the wireless communication method 2. The server calculates a position of the wireless communication method conversion node 202A based upon the received measurement information 743 (701).

Figure 15A:
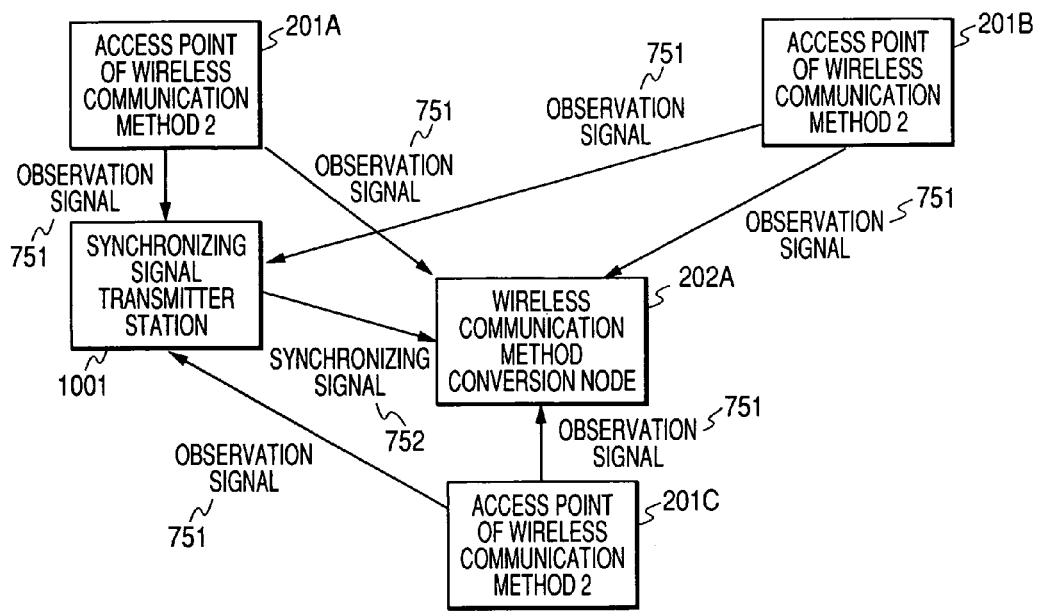
FIG. 15A is an explanatory drawing for explaining a position detection method 5 according to an aspect of the present invention and FIG. 15B is a sequence diagram showing the position detection method 5 according to an aspect of the present invention.
Figure 15B:
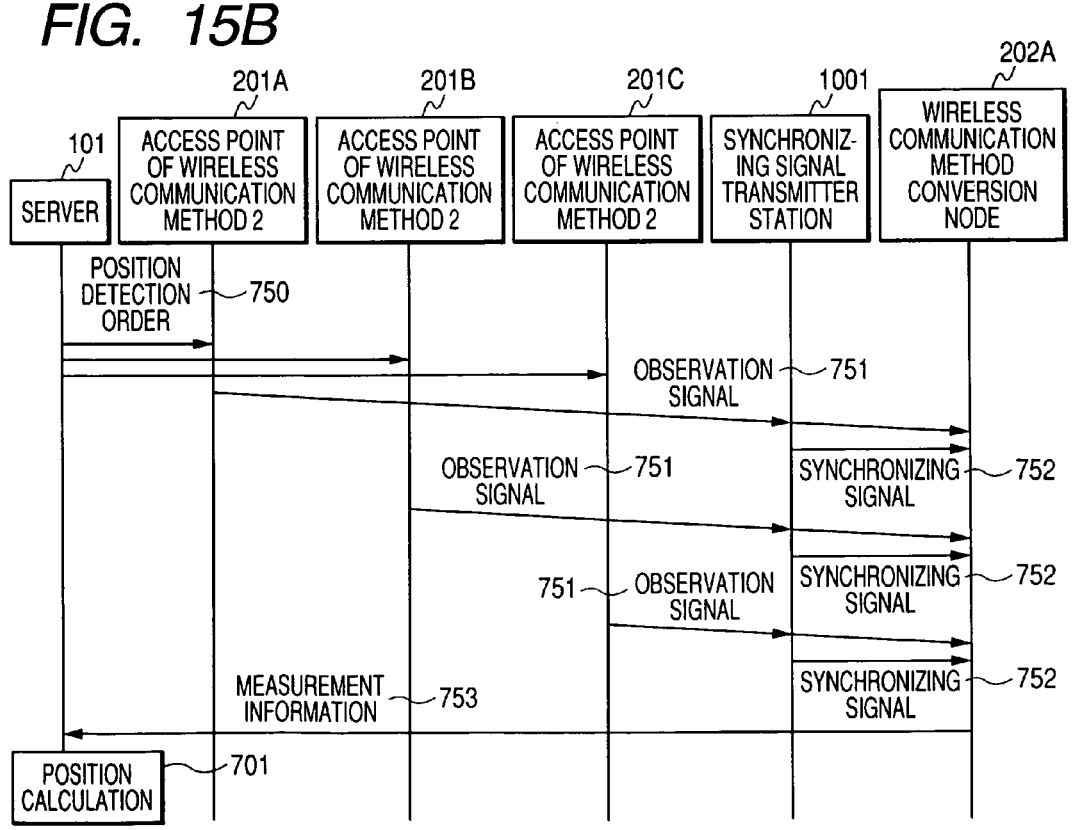

FIG. 15A is an explanatory drawing for explaining a position detection method 5 according to an aspect of the present invention. FIG. 15B is a sequence diagram showing the position detection method 5 according to an aspect of the present invention.

The server 101 executes the position detection method 5, the position detection system in this embodiment shown in FIG. 1 is provided with a synchronizing signal transmitter station 1001.

The processing of the position detection method 5 will be described below.

First, the server 101 sends a position detection order 750 to the access points 201A, 201B and 201C of the wireless communication method 2. The position detection order 750 includes the send timing of an observation signal 751. The send timing may be also the same in all the access points 201A, 201B and 201C and may be different for every access point 201A, 201B, 201C.

The access points 201A, 201B and 201C of the wireless communication method 2 send an observation signal 751 at send timing included in the position detection order 750. The observation signal 751 is a radio signal, a sound wave or an ultrasonic signal and includes a unique identifier of the transmitter.

The wireless communication method conversion node 202A and the synchronizing signal transmitter station 1001 receive the observation signal 751 from the access points 201A, 201B and 201C of the wireless communication method 2. At this time, the wireless communication method conversion node 202A checks time at which the observation signal 751 is received and stores the time. In the meantime, the synchronizing signal transmitter station 1001 sends the synchronizing signal 752 when it receives the observation signal 751. The synchronizing signal 752 is a signal according to the wireless communication method 2 and includes a unique identifier of the transmitter.

Then, the wireless communication method conversion node 202A receives the synchronizing signal 752 from the synchronizing signal transmitter station 1001. At this time, the wireless communication method conversion node 202A checks time at which the synchronizing signal 752 is received and stores the time.

The wireless communication method conversion node 202A obtains the time difference between the synchronizing signal 752 and the observation signal 751 by subtracting the time at which the observation signal 751 is received from the stored time at which the synchronizing signal 752 is received. The wireless communication method conversion node 202A calculates the time difference with the access points 201A, 201B and 201C of the wireless communication method 2.

The wireless communication method conversion node 202A sends the obtained time difference between the synchronizing signal 752 and the observation signal 751 to the server 101 as measurement information 753.

The server 101 receives the measurement information 753 from the wireless communication method conversion node 202A. The server calculates a position of the wireless communication method conversion node 202A based upon the received measurement information 753 (701).

Next, the characteristics of the position detection methods 1 to 5 will be described.

FIG. 16 is a graph showing the power consumption of the wireless communication method conversion node 202A and others according to an aspect of the present invention.

This graph shows the power consumption per unit time (mA/sec) of the wireless communication method conversion nodes 202A that are objects of position detection. The power consumption per unit time (mA/sec) of the nodes 108 that are objects of position detection also has the same graph.

This graph shows a case of the following conditions. A synchronizing signal is a radio signal and an observation signal is a radio signal or an ultrasonic signal. The wireless communication method conversion nodes 202 which are objects of position detection consume the power of 20 mA when the nodes send a radio signal or when the nodes receive a radio signal. The wireless communication method conversion nodes 202 which are objects of position detection consume the power of 40 mA when the nodes send an ultrasonic signal and consume the power of 10 mA when the nodes receive an ultrasonic signal.

According to this graph, in the case of an observation signal that is a radio signal, power consumption in the position detection method 4 is the least. In the meantime, in the case of an observation signal that is an ultrasonic signal, power consumption in the position detection methods 3 and 5 is the least.

The reason why power consumption is different depending upon a type of an observation signal is that power consumption to send an ultrasonic signal is large. That is, in the case of an observation signal that is an ultrasonic signal, power consumption in a position detection method (the position detection methods 3 and 5) in which the wireless communication method conversion nodes 202, the position of which is detected do not send an ultrasonic signal is small.

Next, time (position detection time) required since the server 101 sends a position detection order until it calculates a position is compared. As a result, the position detection methods 3 and 5 require position detection time equivalent to three times or more of the other position detection methods.

In the position detection methods 1, 2 and 4, the access points 201 of the wireless communication method 2 send measurement information to the server 101 every time they receive an observation signal from the wireless communication method conversion node 202A. In the meantime, in the position detection methods 3 and 5, the wireless communication method conversion node 202A the position of which is detected sends measurement information to the server 101 after the conversion node receives an observation signal from all access points 201 of the wireless communication method 2 that exist around. Therefore, the position detection methods 3 and 5 require more position detection time, compared with that in the other position detection methods.

Next, an error (measurement accuracy) in positions calculated by the server 101 of the wireless communication method conversion nodes 202 is compared. When an observation signal is an ultrasonic signal, measurement accuracy is 1 to 30 cm. In the meantime, when an observation signal is a radio signal, measurement accuracy is 1 to 3 m.

Difference in measurement accuracy is made from difference in sound wave velocity. The sound wave velocity of a radio signal is faster by approximately the 6/10th power when it is compared with the sound wave velocity of an ultrasonic signal. Therefore, in the case of a radio signal, an effect upon measurement accuracy by an error in measurement time including time at which a signal is received is larger than that in the case of an ultrasonic signal.

As described above, characteristics including power consumption, position detection time and measurement accuracy are different depending upon the combination (a position detection method) of the position detection method and a type of an observation signal. In this embodiment, the server 101 determines the position detection method of the wireless communication method conversion nodes 202 or the nodes 108 in consideration of characteristics of the respective position detection methods.

FIG. 17 is a sequence diagram showing a position calculation process of the position detection system according to an aspect of the present invention.

First, the wireless communication method conversion nodes 202, the nodes 108 send state notice including the status of the battery to the server 101. The status of the battery includes the output voltage of the battery, a date of battery exchange and/or the cumulative power consumption of the battery.

The server 101 receives state notice from the wireless communication method conversion nodes 202, the nodes 108. Next, the server 101 determines a position detection method based upon the received state notice (1301). The position detection method determination process 1301 will be described later in detail in relation to FIG. 21.

Next, the server 101 notifies the wireless communication method conversion nodes 202 and the nodes 108 of the determined position detection method.

Then, the wireless communication method conversion nodes 202 and the nodes 108 execute processing corresponding to the notified position detection method. The server 101 calculates a position of the wireless communication method conversion nodes 202 or the nodes 108 by the notified position detection method.

Figure 18:
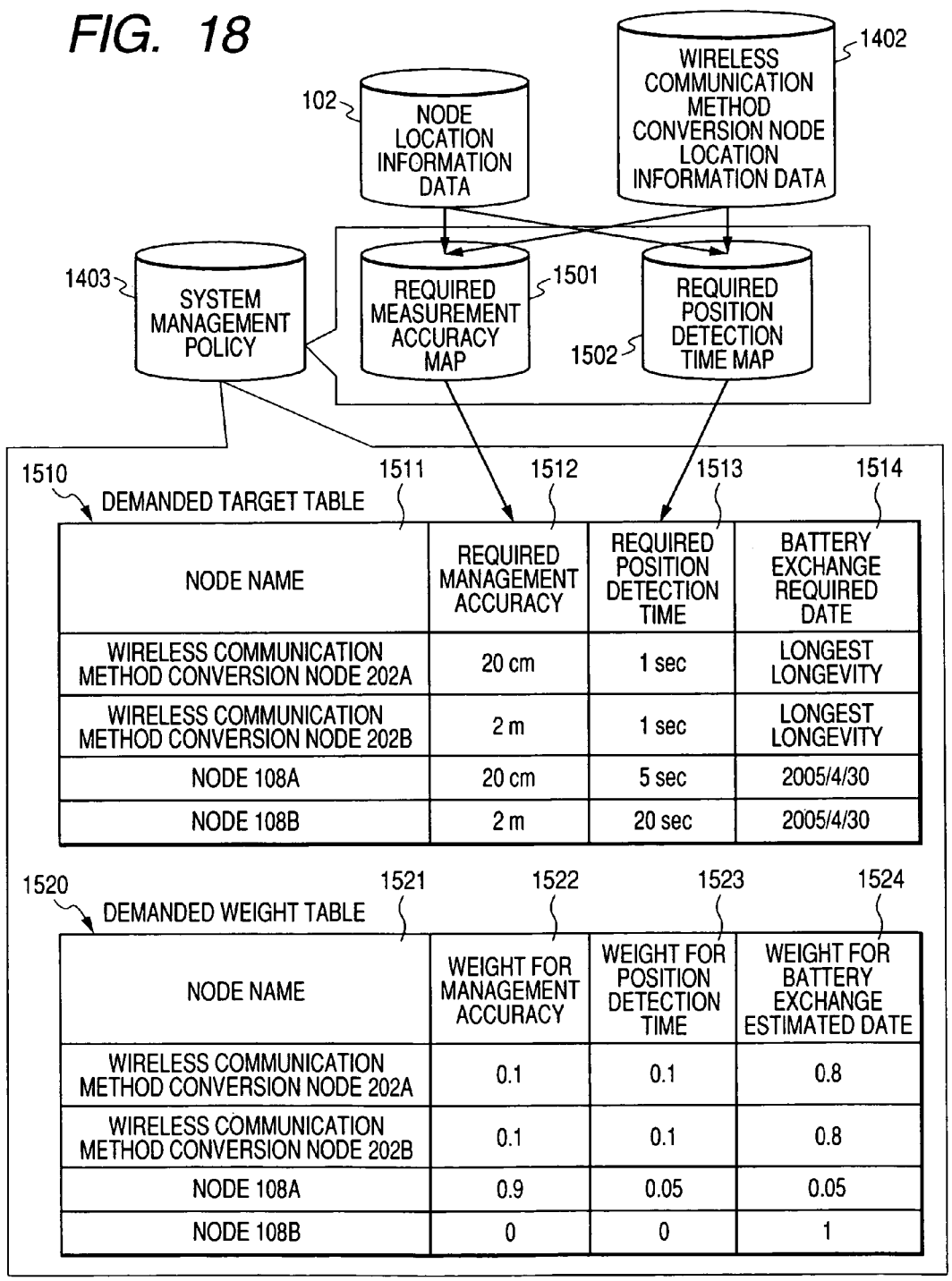
FIG. 18 is an explanatory drawing for explaining system management policy with which the server is provided according to an aspect of the present invention.

FIG. 18 is an explanatory drawing for explaining system management policy 1403 with which the server 101 is provided according to an aspect of the present invention.

The system management policy 1403 includes a demanded target table 1510 and a demanded weight table 1520.

The demanded target table 1510 includes a node name 1511, required measurement accuracy 1512, required position detection time 1513 and a battery exchange required date 1514.

The node name 1511 is a unique identifier of the wireless communication method conversion nodes 202 or the nodes 108.

The required measurement accuracy 1512 is a required target value of measurement accuracy of the wireless communication method conversion nodes 202 or the nodes 108. The measurement accuracy is an error of a position calculated by the server 101 of the wireless communication method conversion nodes 202 or an error of a position calculated by the server 101 of the nodes 108. The required measurement accuracy 1512 may be also a preset fixed value and a change by a user may be also enabled.

The required position detection time 1513 is a required target value of position detection time of the wireless communication method conversion nodes 202 or the nodes 108. The required position detection time 1513 may be also a preset fixed value and a change by a user may be also enabled.

The battery exchange required date 1514 is a required target value of a battery exchange estimated date of the wireless communication method conversion nodes 202 or the nodes 108. In case the battery exchange estimated date of the wireless communication method conversion nodes 202 or the nodes 108 is desired to be possibly extended, "longest longevity" is stored in a field of the battery exchange required date 1514.

The unit of the battery exchange estimated date is not limited to a date and the estimated date may be also time information in units of a second of an estimated date.

The demanded weight table 1520 includes a node name 1521, weight of measurement accuracy 1522, weight of position detection time 1523 and weight of a battery exchange estimated date 1524.

The node name 1521 is a unique identifier of the wireless communication method conversion nodes 202 or the nodes 108.

The weight of measurement accuracy 1522 is the criticality of a required target value of measurement accuracy of the wireless communication method conversion nodes 202 or the nodes 108.

The weight of position detection time 1523 is the criticality of a required target value of position detection time of the wireless communication method conversion nodes 202 or the nodes 108.

The weight of a battery exchange estimated date 1524 is the criticality of a required target value of a battery exchange estimated date of the wireless communication method conversion nodes 202 or the nodes 108.

The system management policy 1403 may also further include a required measurement accuracy map 1501 and a required position detection time map 1502.

The required measurement accuracy map 1501 shows correspondence between a position of the wireless communication method conversion nodes 202 or the nodes 108 and a required target value of measurement accuracy.

The server 101 determines a position of the nodes 108 referring to the node location information data 102. Next, the server 101 obtains a required target value of measurement accuracy of the nodes 108 by comparing the determined position of the nodes 108 and the required measurement accuracy map 1501. The server 101 stores the obtained required target value in a field of the required measurement accuracy 1512 of the demanded target table 1510.

Similarly, the server 101 determines a position of the wireless communication method conversion nodes 202 referring to the wireless communication method conversion node location information data 1402. Next, the server 101 obtains a required target value of measurement accuracy of the wireless communication method conversion nodes 202 by comparing the determined position of the wireless communication method conversion nodes 202 and the required measurement accuracy map 1501. The server 101 stores the obtained required target value in the field of the required measurement accuracy 1512 of the demanded target table 1510.

Hereby, the server 101 can change the required measurement accuracy 1512 in the demanded target table 1510 according to the position of the nodes 108 or the position of the wireless communication method conversion nodes 202.

The required position detection time map 1513 shows correspondence between a position of the wireless communication method conversion nodes 202 or the nodes 108 and a required target value of position detection time.

The server 101 determines a position of the nodes 108 referring to the node location information data 102. Next, the server 101 obtains a required target value of position detection time of the nodes 108 by comparing the determined position of the nodes 108 and the required position detection time map 1502. The server 101 stores the obtained required target value in a field of the required position detection time 1513 of the demanded target table 1510.

Similarly, the server 101 determines a position of the wireless communication method conversion nodes 202 referring to the wireless communication method conversion node location information data 1402. Next, the server 101 obtains a required target value of position detection time of the wireless communication method conversion nodes 202 by comparing the determined position of the wireless communication method conversion nodes 202 and the required position detection time map 1502. The server 101 stores the obtained required target value in the field of the required position detection time 1513 of the demanded target table 1510.

Hereby, the server 101 can change the required position detection time 1513 in the demanded target table 1510 according to the position of the nodes 108 or the position of the wireless communication method conversion node 202.

Next, the wireless communication method conversion node status management data 1405 with which the server 101 is provided will be described. The wireless communication method conversion node status management data 1405 includes a measurement state table, a position detection method selection table and an estimate list table.

FIG. 19A shows the configuration of the measurement state table 1600 in the wireless communication method conversion node status management data 1405 according to an aspect of the present invention.

The measurement state table 1600 includes a wireless communication method conversion node name 1601, battery output power 1602, a battery exchange date 1603, cumulative power consumption 1604, measurement accuracy 1605 and position detection time 1606.

The wireless communication method conversion node name 1601 is a unique identifier of the wireless communication method conversion nodes 202.

The battery output power 1602 is the output voltage of the battery 2410 of the wireless communication method conversion node 202.

The battery exchange date 1603 is a date in which the battery 2410 of the wireless communication method conversion nodes 202 was exchanged last time.

The cumulative power consumption 1604 is a value of the cumulative power consumption of the battery 2410 of the wireless communication method conversion nodes 202.

The measurement accuracy 1605 is an error of a position calculated last time of the wireless communication method conversion nodes 202. The position detection time 1606 is the position detection time when the position of the wireless communication method conversion nodes 202 was detected last time. The position detection time is the time required since the server 101 sends a position detection order until the server calculates the position.

The server 101 updates the measurement state table 1600 in the wireless communication method conversion node status management data 1405 when the server receives status notice from the wireless communication method conversion nodes 202.

Concretely, the server selects a record in which an identifier of the wireless communication method conversion node 202A that sends the status notice and the wireless communication method conversion node name 1601 in the measurement state table 1600 accord from the measurement state table 1600.

Next, the server stores the output voltage of the battery 2410 included in the received status notice in a field of the battery output power 1602 in the selected record. Next, the server stores the last exchange date of the battery 2410 included in the received status notice in a field of the battery exchange date 1603 in the selected record. Next, the server stores the cumulative power consumption of the battery 2410 included in the received status notice in a field of the cumulative power consumption 1604 in the selected record.

The server 101 updates the measurement state table 1600 in the wireless communication method conversion node status management data 1405 when the server calculates a position of the wireless communication method conversion nodes 202.

The server selects a record in which an identifier of the wireless communication method conversion node 202A the position of which is calculated and the wireless communication method conversion node name 1601 in the measurement state table 1600 accord from the measurement state table 1600.

Next, the server 101 stores obtained measurement accuracy in a field of the measurement accuracy 1605 in the selected record. Next, the server 101 calculates time since the server sends a position detection order until the server calculates the position (position detection time). The server stores the obtained position detection time in a field of the position detection time 1606 in the selected record.

The server 101 calculates measurement accuracy together when it calculates a position of the wireless communication method conversion nodes 202.

The server 101 may also obtain measurement accuracy corresponding to a position detection method by being providing with a table showing relation between position detection method and measurement accuracy. The measurement accuracy stored in the table is equivalent to a value estimated by simulation in consideration of the number of the access points 201 of the wireless communication method 2 existing around the wireless communication method conversion node 202.

FIG. 19B shows the configuration of a position detection method selection table 1610 in the wireless communication method conversion node status management data 1405 according to an aspect of the present invention.

The position detection method selection table 1610 includes a wireless communication method conversion node name 1611, a position detection method 1612, an observation signal 1613, estimated power consumption 1614, estimated position detection accuracy 1615 and estimated position detection time 1616.

The wireless communication method conversion node name 1611 is a unique identifier of the wireless communication method conversion nodes 202.

The position detection method 1612 is an identifier of a position detection method used in the next position detection of the wireless communication method conversion node 202A and others.

The observation signal 1613 denotes a type of an observation signal used in the next position detection of the wireless communication method conversion nodes 202. For example, in a field of the observation signal 1613, "ultrasonic" or "radio" is stored.

The estimated power consumption 1614 is an estimated value of power consumption when the position of the wireless communication method conversion nodes 202 is detected next time.

The estimated position detection accuracy 1615 is an estimated value of position detection accuracy when the position of the wireless communication method conversion nodes 202 is detected next time. For example, the estimated position detection accuracy 1615 is uniquely determined depending upon a type of an observation signal used when the position of the wireless communication method conversion nodes 202 is detected next time. The position detection accuracy 1615 is equivalent to an error related to a position that the server 101 obtained by trilateration of the wireless communication method conversion node 202A.

The estimated position detection time 1616 is an estimated value of position detection time when the position of the wireless communication method conversion nodes 202 is detected next time.

Figure 21:
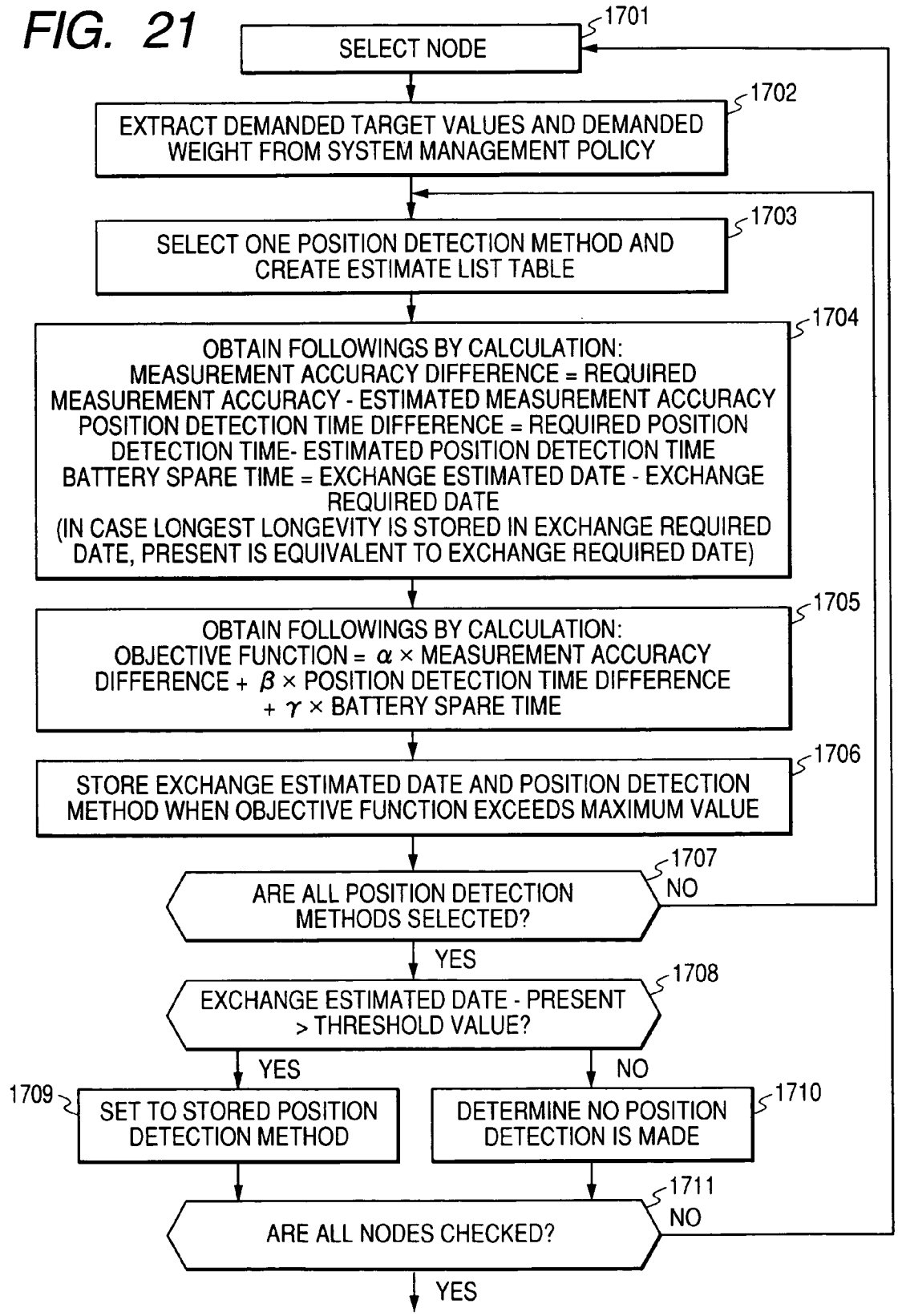
FIG. 21 is a flowchart showing a position detection method determination process by the server according to an aspect of the present invention.

The server 101 updates the position detection method selection table 1610 when the server determines a position detection method of the wireless communication method conversion nodes 202 according to a position detection method determination process shown in FIG. 21.

The server selects a record in which the identifier of the wireless communication method conversion node 202A the position detection method of which is determined and the wireless communication method conversion node name 1611 in the position detection method selection table 1610 accord from the position detection method selection table 1610.

Next, the server stores the determined position detection method in a field of the position detection method 1612 in the selected record. Next, the server stores a type of an observation signal in the determined position detection method in a field of the observation signal 1613 in the selected record.

Next, the server 101 calculates estimated power consumption, estimated position detection accuracy and estimated position detection time of the wireless communication method conversion nodes 202 based upon the determined position detection method. For example, the server 101 can uniquely calculate the estimated power consumption, the estimated position detection accuracy and the estimated position detection time of the wireless communication method conversion nodes 202 by being provided with a table showing correspondence between this information and the position detection method.

Next, the server stores the calculated estimated power consumption of the wireless communication method conversion nodes 202 in a field of the estimated power consumption 1614 in the selected record. Next, the server stores the calculated estimated position detection accuracy of the wireless communication method conversion nodes 202 in a field of the estimated position detection accuracy 1615 in the selected record. Next, the server stores the calculated estimated position detection time of the wireless communication method conversion nodes 202 in a field of the estimated position detection time 1616 in the selected record.

FIG. 19C shows the configuration of an estimate list table 1620 in the wireless communication method conversion node status management data 1405 according to an aspect of the present invention.

The estimate list table 1620 includes a wireless communication method conversion node name 1621, a battery exchange estimated date 1622, estimated position detection accuracy 1623 and estimated position detection time 1624.

The wireless communication method conversion node name 1621 is a unique identifier of the wireless communication method conversion nodes 202.

The battery exchange estimated date 1622 is a date on which the next exchange of the battery 2410 of the wireless communication method conversion nodes 202 is estimated. The battery exchange estimated date 1622 is an estimated date in case the next position detection method of the wireless communication method conversion nodes 202 is continued.

The unit of the battery exchange estimated date 1622 is not only a date but may be also time information in units of a second.

The estimated measurement accuracy 1623 is an estimated value of an error related to a position detected next time of the wireless communication method conversion nodes 202. The estimated position detection time 1624 is an estimated value of position detection time when the position of the wireless communication method conversion nodes 202 is detected next time.

The server 101 creates the estimate list table 1620 in the position detection method determination process shown in FIG. 21.

The server selects a record in which an identifier of the wireless communication method conversion nodes 202, the list of which is created and the wireless communication method conversion node name 1621 in the estimate list table 1620 accord from the estimate list table 1620.

Next, the server calculates duration estimated time of the battery 2410 of the wireless communication method conversion nodes 202 based upon the next position detection method of the wireless communication method conversion nodes 202, the list of which is created.

For example, the server 101 calculates the duration estimated time T (hour) of the battery 2410 of the wireless communication method conversion nodes 202 by the following mathematical expression 1.

$$T = \frac{XY - Z}{sW - tI} \times (s + t) \qquad \text{[Mathematical expression 1]}$$

X (mAh) denotes the capacity of the battery 2410 of the wireless communication method conversion nodes 202. Y (%) denotes the operational efficiency of the battery 2410 of the wireless communication method conversion nodes 202. Z (mAh) denotes the cumulative power consumption of the battery 2410 of the wireless communication method conversion nodes 202. W (mA) denotes current consumed when the position of the battery 2410 of the wireless communication method conversion nodes 202 is detected. "s (hour)" denotes the position detection time of the wireless communication method conversion nodes 202. "t (hour)" denotes an interval in the position detection of the wireless communication method conversion nodes 202. I (mA) denotes the consumed current in an interval of the battery 2410 of the wireless communication method conversion nodes 202.

Next, the server 101 calculates an exchange estimated date of the battery 2410 by adding the current date to the calculated duration estimated time T. The server stores the calculated exchange estimated date in a field of the battery exchange estimated date 1622 in the record selected from the estimate list table 1620.

In addition, the server 101 may also calculate the battery exchange estimated date 1622 based upon a change of the output voltage of the battery 2410.

The server 101 holds a battery characteristic table showing relation between the output voltage of the battery 2410 and the duration estimated time every average power consumption.

In case the output voltage of the battery 2410 exceeds a threshold value, the server calculates the battery exchange estimated date 1622 by adding the average duration of the battery 2410 to the last battery exchange date.

In the meantime, when the output voltage of the battery 2410 is lower than the threshold value, the server obtains the duration estimated time of the battery 2410 based upon the battery characteristic table. The server calculates the battery exchange estimated date 1622 by adding the current date to the obtained duration estimated time.

Next, the server 101 selects a record in which an identifier of the wireless communication method conversion nodes 202, the list of which is created and the wireless communication node name 1611 in the position detection method selection table 1610 accord from the position detection method selection table 1610. Next, the server extracts the estimated position detection accuracy 1615 from the selected record.

Next, the server counts the number of the access points 201 of the wireless communication method 2 existing around the wireless communication method conversion nodes 202, the list of which is created. The server calculates an error (measurement accuracy) related to a position of the wireless communication method conversion node 202A based upon the extracted estimated position detection accuracy 1615 and the counted number of the access points 201 of the wireless communication method 2.

The server stores the calculated measurement accuracy in a field of the estimated measurement accuracy 1623 in a record selected from the estimate list table 1620.

Next, the server 101 determines whether the last position detection method of the wireless communication method conversion nodes 202, the list of which is created and may be the same as the next position detection method.

When the position detection methods are the same, the server selects a record in which an identifier of the wireless communication method conversion nodes 202 the list of which is updated and the wireless communication method conversion node name 1601 in the measurement state table 1600 accord from the measurement state table 1600. Next, the server extracts the position detection time 1606 from the selected record. The server stores the extracted position detection time 1606 in a field of the estimated position detection time 1624 in the selected record from the estimate list table 1620.

In the meantime, when the position detection methods are different, information in the measurement state table 1600 cannot be used. Therefore, the server selects a record in which an identifier of the wireless communication method conversion nodes 202, the list of which is created and the wireless communication method conversion node name 1611 in the position detection method selection table 1610 accord from the position detection method selection table 1610. Next, the server extracts the estimated position detection time 1616 from the selected record. The server stores the extracted estimated position detection time 1616 in a field of the estimated position detection time 1624 in a record selected from the estimate list table 1620.

As described above, the server 101 creates the estimate list table 1620.

Next, the node status management data 1404 with which the server 101 is provided will be described. The node status management data 1404 includes a measurement state table, a position detection method selection table and an estimate list table like the above-mentioned wireless communication method conversion node status management data 1405.

FIG. 20A shows the configuration of the measurement state table 1650 in the node status management data 1404 according to an aspect of the present invention.

The measurement state table 1650 includes a node name 1651, battery output power 1652, a battery exchange date 1653, cumulative power consumption 1654, measurement accuracy 1655 and position detection time 1656.

The node name 1651 is a unique identifier of the node 108A and others.

The battery output power 1652 is the output voltage of the battery 2307 of the nodes 108.

The battery exchange date 1653 is a date on which the battery 2307 of the nodes 108 was exchanged last time.

The cumulative power consumption 1654 is a cumulative value of the consumption of the battery 2307 of the nodes 108.

The measurement accuracy 1655 is an error related to a position calculated last time of the nodes 108.

The position detection time 1656 is position detection time when a position of the nodes 108 was detected last time. The position detection time is time required since the server 101 sends position detection order until the server calculates a position.

The server 101 updates the measurement state table 1650 when the server receives state notice from the nodes 108. As a process for updating the measurement state table 1650 in the node status management data 1404 is similar to the process for updating the measurement state table 1600 shown in FIG. 19A in the wireless communication method conversion node status management data 1405, the description is omitted.

FIG. 20B shows the configuration of a position detection method selection table 1660 in the node status management data 1404 according to an aspect of the present invention.

The position detection method selection table 1660 includes a node name 1661, a position detection method 1662, an observation signal 1663, estimated power consumption 1664, estimated position detection accuracy 1665 and estimated position detection time 1666.

The node name 1661 is a unique identifier of the nodes 108.

The position detection method 1662 is an identifier of a position detection method used for the next position detection of the nodes 108. The observation signal 1663 is a type of an observation signal used for the next position detection of the nodes 108. For example, "ultrasonic signal" or "radio signal" is stored in a field of the observation signal 1663.

The estimated power consumption 1664 is an estimated value of power consumption when a position of the nodes 108 is detected next time.

The estimated position detection accuracy 1665 is an estimated value of position detection accuracy when a position of the nodes 108 is detected next time. For example, the estimated position detection accuracy 1665 is uniquely determined depending upon a type of an observation signal used when a position of the nodes 108 is detected next time.

The estimated position detection time 1666 is an estimated value of position detection time when a position of the nodes 108 is detected next time.

The server 101 updates the position detection method selection table 1660 when the server determines a position detection method of the nodes 108 in the position detection method determination process shown in FIG. 21. As a process for updating the position detection method selection table 1660 in the node status management data 1404 is similar to the process for updating the position detection method selection table 1610 shown in FIG. 19B in the wireless communication method conversion node status management data 1405, the description is omitted.

FIG. 20C shows the configuration of an estimate list table 1670 in the node status management data 1404 according to an aspect of the present invention.

The estimate list table 1670 includes a node name 1671, a battery exchange estimated date 1672, estimated measurement accuracy 1673 and estimated position detection time 1674.

The node name 1671 is a unique identifier of the nodes 108.

The battery exchange estimated date 1672 is a date on which the next exchange of the battery 2307 of the nodes 108 is estimated. The battery exchange estimated date 1672 is an estimated date in case the next position detection method of the nodes 108 is continued.

The unit of the battery exchange estimated date 1672 is not limited to a date and may be also time information in units of a second.

The estimated measurement accuracy 1673 is an estimated value of an error related to a position detected next time of the nodes 108. The estimated position detection time 1674 is an estimated value of position detection time when a position of the nodes 108 is detected next time.

The server 101 updates the estimate list table 1670 in the position detection method determination process shown in FIG. 21. As a process for updating the estimate list table 1670 in the node status management data 1404 is similar to the process for updating the position detection method selection table 1620 shown in FIG. 19C in the wireless communication method conversion node status management data 1405, the description is omitted.

FIG. 21 is a flowchart showing the position detection method determination process by the server 101 according to an aspect of the present invention.

In the case that a position detection method of the nodes 108 is determined will be described as an example below, however, a case that a position detection method of the wireless communication method conversion nodes 202 is determined is similarly processed.

First, the server 101 sequentially selects the nodes 108 one by one (1701).

Next, the server extracts demanded target values and demanded weight related to the selected node 108 from the system management policy 1403 shown in FIG. 18.

Concretely, the server selects a record in which an identifier of the selected node 108 and the node name 1511 in the demanded target table 1510 included in the system management policy 1403 accord from the demanded target table 1510. The server extracts the required measurement accuracy 1512, the required position detection time 1513 and the battery exchange required date 1514 from the selected record.

Next, the server selects a record in which an identifier of the selected node 108 and the node name 1521 in the demanded weight table 1520 included in the system management policy 1403 accord from the demanded weight table 1520. The server extracts the weight for measurement accuracy 1522, the weight for position detection time 1523 and the weight for a battery exchange estimated date 1524 from the selected record (1702).

Next, the server sequentially selects a position detection method one by one. Next, the server creates the estimate list table 1670 based upon the measurement state table 1650 and the position detection method selection table 1660 according to the above-mentioned method in relation to FIG. 20C (1703).

The server extracts the battery exchange estimated date 1672, the estimated measurement accuracy 1673 and the estimated position detection time 1674 from the created estimate list table 1670.

Next, the server calculates difference between a value extracted from the demanded target table 1510 and a value extracted from the estimate list table 1670 (1704).

The server calculates measurement accuracy difference, position detection time difference and battery spare time.

First, the server 101 calculates measurement accuracy difference A using a mathematical expression 2.

$$A = Ar - Af$$ [Mathematical expression 2]

Af denotes the estimated measurement accuracy 1673 extracted from the estimate list table 1670. Ar denotes the required measurement accuracy 1512 extracted from the demanded target table 1510.

Next, the server 101 calculates position detection time difference B using a mathematical expression 3.

$$B = Br - Bf$$ [Mathematical expression 3]

Bf denotes the estimated position detection time 1674 extracted from the estimate list table 1670. Br denotes the required position detection time 1513 extracted from the demanded target table 1510.

Next, the server 101 calculates battery spare time C using a mathematical expression 4.

$$C = Cf - Cr$$ [Mathematical expression 4]

Cf denotes the battery exchange estimated date 1672 extracted from the estimate list table 1670. Cr denotes the battery exchange required date 1514 extracted from the demanded target table 1510. However, in case "longest longevity" is stored in a field of the battery exchange required date 1514, Cr denotes the current date. In case the battery exchange estimated date 1672 and the battery exchange required date 1514 include a date and time information and "longest longevity" is stored in the field of the battery exchange required date 1514, Cr denotes the current date and time information.

Next, the server 101 calculates an objective function F using a mathematical expression 5 (1705).

$$F = \alpha A + \beta B + \gamma C$$ [Mathematical expression 5]

"α" denotes the weight for measurement accuracy 1522 extracted from the demanded weight table 1520. "β" denotes the weight for position detection time 1523 extracted from the demanded weight table 1520. "γ" denotes the weight for a battery exchange estimated date 1524 extracted from the demanded weight table 1520.

Next, when a calculated value of the objective function F exceeds the stored maximum value, the server 101 stores the calculated value as the maximum value. Further, the server stores the position detection method selected in the step 1703 and the battery exchange estimated date 1672 extracted from the estimate list table 1670 (1706).

In the meantime, when the calculated value of the objective function F is equal to or smaller than the stored maximum value, the process proceeds to a step 1707.

Next, it is determined whether all position detection methods are selected in the step 1703 or not (1707).

In case all position detection methods are not selected, control is returned to the step 1703 to calculate an objective function F of an unselected position detection method.

In the meantime, in the case where all position detection methods are selected, the current date is subtracted from the stored battery exchange estimated date 1672. In the case where the battery exchange estimated date 1672 includes a date and time information, time difference is obtained by subtracting the current date and time information. It is determined whether the subtracted value is larger than a threshold value or not (1708).

In the case where the subtracted value is larger than the threshold value, the position detection method stored in the step 1706 is determined as the position detection method selected in the step 1701 of the node 108A and others (1709). The process proceeds to a step 1711.

In the meantime, in the case where the subtracted value is equal to or smaller than the threshold value, the battery 2307 of the nodes 108 does not last by predetermined time when a position of the nodes 108 selected in the step 1701 is continued to be detected. Therefore, it is determined that positions of the nodes 108 are not detected (1710).

Next, it is determined whether all nodes 108 are selected in the step 1701 or not (1711).

In case all nodes 108 are not selected, control is returned to the step 1701 to determine a position detection method of unselected nodes 108.

In the meantime, in the case where all the nodes 108 are selected, the position detection method determination process is finished because the position detection methods of all nodes 108 are determined.

For example, the position detection method determination process in case γ is 1 and α and β are 0 will be described below. In this case, only the position detection methods 2 and 3 are selected in the step 1703.

In this case, the server 101 determines that an observation signal of the nodes 108 is an ultrasonic signal and a position detection method of the nodes 108 is the position detection method 3. The reason is that current consumed per unit time by the position detection method 3 is less than current consumed per unit time by the position detection method 2.

A case that γ is 0.8, β is 0.2 and α is 0 will be described below. In this case, only the position detection methods 2 and 3 are selected in the step 1703.

In this case, the server 101 determines that an observation signal of the nodes 108 having the battery 2307 having spare time to some extent is an ultrasonic signal and a position detection method of the nodes 108 is the position detection method 2. The reason is that position detection time in the position detection method 2 is shorter than that in the position detection method 3.

In the meantime, the server 101 determines that an observation signal of the nodes 108 having the battery 2307 having no spare time is an ultrasonic signal and a position detection method is the position detection method 3. The reason is that current consumed per unit time by the position detection method 3 is less than current consumed per unit time by the position detection method 2.

As described above, the server 101 determines the position detection method of the nodes 108 according to weight stored in the demanded weight table 1520.

According to this embodiment, the server 101 can calculate a position of the nodes 108 using the position detection method according to the status of the nodes 108 (for example, the status of the battery 2307). For example, the server 101 uses a position detection method that requires only little power consumption when the longevity of the battery 2307 of the nodes 108 is short.

Besides, the server 101 can calculate a position of the nodes 108 using a position detection method different every node. Therefore, a position detection method according to a characteristic of the nodes 108 can be used. For example, for the nodes 108 that require high-accuracy position detection, a position detection method the measurement accuracy of which is high is used even if the position detection method requires much power consumption. For the nodes 108 that do not require high-accuracy position detection, a position detection method that requires only little power consumption is used even if the measurement accuracy of the position detection method is low.

According to an aspect of the present invention, nodes 108, a wireless communication method conversion nodes 202 control the output power of a synchronizing signal and/or an observation signal.

The configuration of a position detection system in the second embodiment is the same as the configuration shown in FIG. 1 in the first embodiment. The processing of the position detection system in the second embodiment is the same as the processing shown in FIGS. 17 and 21 in the first embodiment except that the nodes 108, the wireless communication method conversion nodes 202 control the output power. Where the configuration and the processing are the same, the description is omitted.

Figure 22:
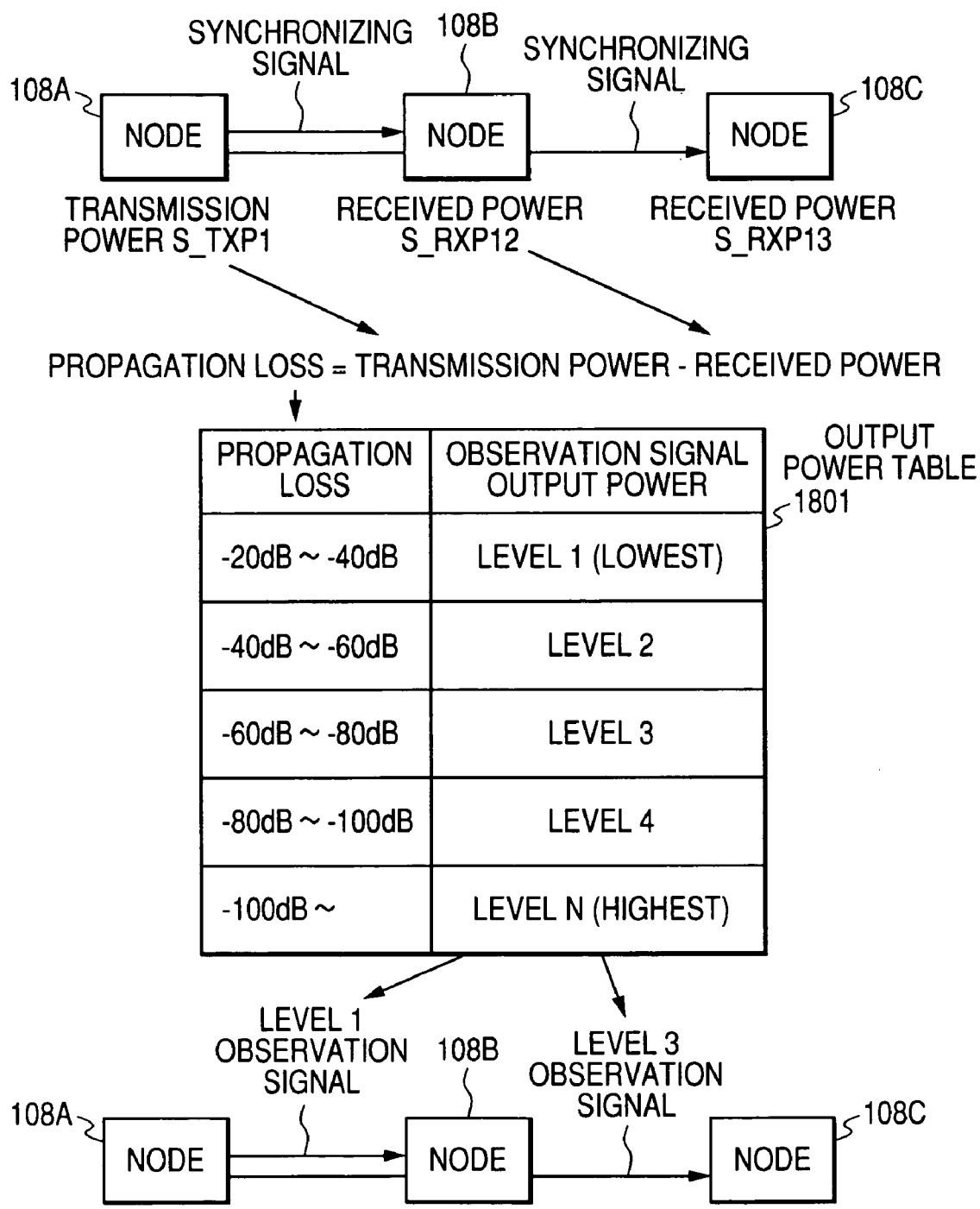
FIG. 22 is an explanatory drawing for explaining control over the output power of a node according to an aspect of the present invention.

FIG. 22 is an explanatory drawing for explaining output power control by the nodes 108 according to an aspect of the present invention.

In this explanatory drawing, the output power control by the nodes 108 is shown as an example, however, the output power control by the wireless communication method conversion nodes 202 are also similar.

First, the node 108A sends a synchronizing signal by wireless with the output of transmission power S_TXP1.

Then, the nodes 108B and 108C receive the synchronizing signal from the node 108A. The node 108B measures the power S_RXP12 of the received synchronizing signal. Similarly, the node 108C measures the power S_RXP13 of the received synchronizing signal.

A server 101 calculates propagation loss P12 on a wireless propagation path between the node 108A and the node 108B using a mathematical expression 6.

$$P_{12} = S\_TXP_1 - S\_RXP_{12} \qquad \text{[Mathematical expression 6]}$$

Similarly, the server calculates propagation loss P13 on a wireless propagation path between the node 108A and the node 108C.

Next, the server 101 determines an output power level of an observation signal by referring to an output power table 1801.

The output power table 1801 shows correspondence between propagation loss between the node 108A and an output power level of an observation signal. For example, the output power table 1801 is set so that the smaller propagation loss between the node 108A is, the smaller an output power level of an observation signal is. Besides, the output power table is set so that the larger propagation loss between the node 108A is, the larger an output power level of an observation signal is.

The server 101 may also determine an output power level of an observation signal using a relational expression between propagation loss between the node 108A and the output power level of the observation signal without referring to the output power table 1801.

For example, the server 101 determines an output power level of an observation signal sent to the node 108B as a level 1. The server determines an output power level of an observation signal sent to the node 108C as a level 3.

The server 101 notifies the node 108A of the determined output power levels.

Then, the node 108A sends an observation signal at the notified output power level. That is, the node 108A sends an observation signal to the node 108B at the output power level of the level 1. Further, the node 108A sends an observation signal to the node 108C at the output power level of the level 3.

Figure 23:
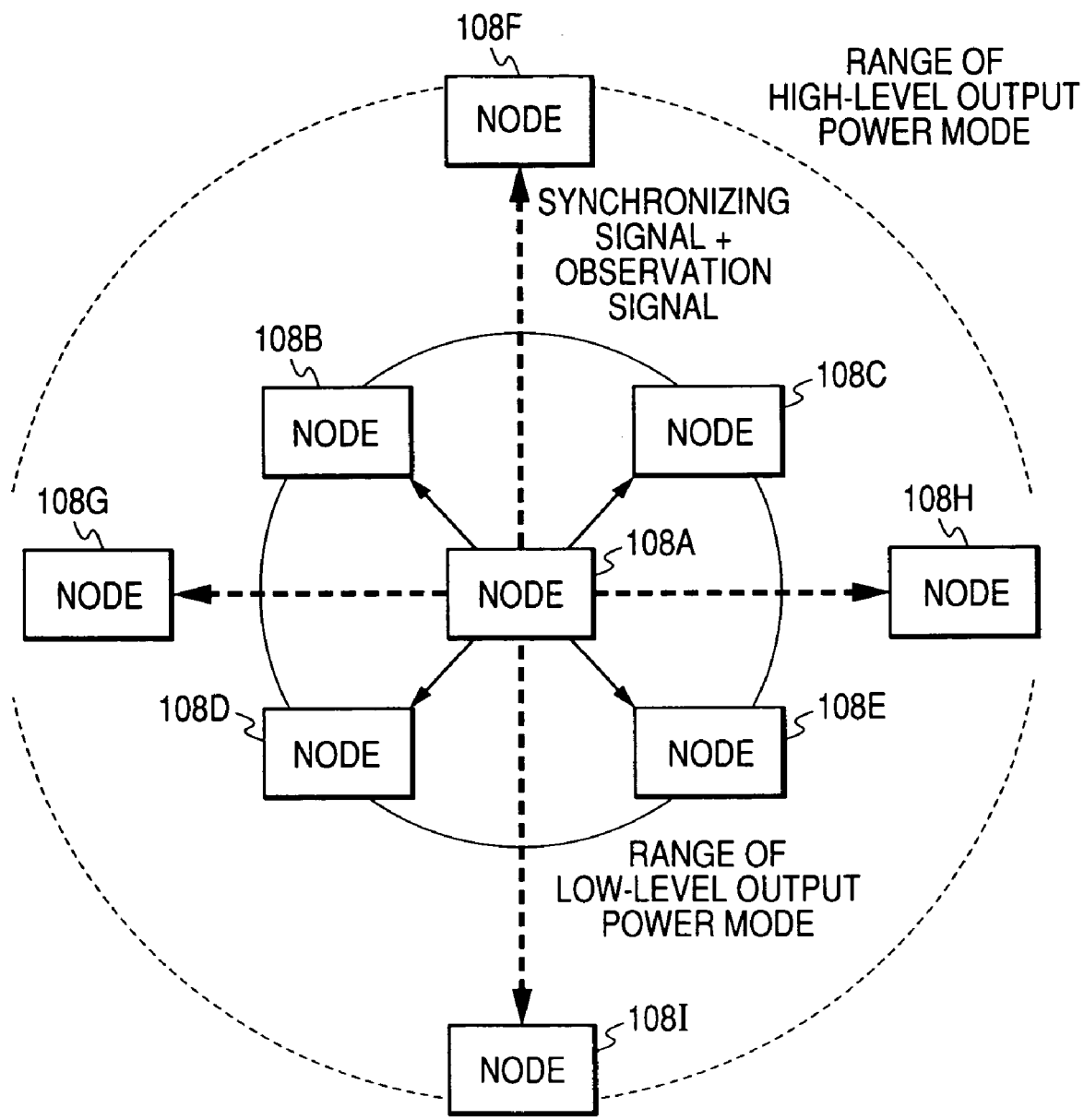
FIG. 23 is an explanatory drawing for explaining output power control in a position detection method 2 according to an aspect of the present invention.

FIG. 23 is an explanatory drawing for explaining output power control in a position detection method 2 according to an aspect of the present invention.

In this explanatory drawing, the server 101 detects a position of the node 108A.

The node 108A sends a synchronizing signal and an observation signal, changing an output power level. In this case, the node 108A sends a synchronizing signal and an observation signal at either of a low output power level or a high output power level.

For example, supposed that the node 108A sends a synchronizing signal and an observation signal at the low output power level. Then, the nodes 108B, 108C, 108D and 108E existing in a range of a low-level output power mode receive the synchronizing signal and the observation signal from the node 108A. The range of the low-level output power mode is a range in which the synchronizing signal and the observation signal sent at the low output power level by the node 108A can be received.

Suppose that the node 108A sends a synchronizing signal and an observation signal at the high output power level. Then, the nodes 108B, 108C, 108D, 108E, 108F, 108G, 108H and 108I existing in a range of a high-level output power mode receive the synchronizing signal and the observation signal from the node 108A. The range of the high-level output power mode is a range in which the synchronizing signal and the observation signal sent at the high output power level by the node 108A can be received.

That is, the node 108A sends a synchronizing signal and an observation signal to the near nodes 108B, 108C and 108D at the low output power level. Besides, the node 108A sends a synchronizing signal and an observation signal to the far nodes 108E, 108F, 108G and 108H at the high output power level.

When the node 108A sends a synchronizing signal and an observation signal at the high output power level, the number of the circumferential nodes 108B and others that receive the synchronizing signal and the observation signal increases. Therefore, as the server 101 receives measurement information from the many circumferential nodes 108, the server can calculate a position of the node 108A with high accuracy. However, as the nodes 108 send a synchronizing signal and an observation signal at the high output power level, a problem that much power is consumed occurs.

Then, the node 108A sends a synchronizing signal and an observation signal at the low output power level. Then, the accuracy of a position of the node 108A calculated by the server 101 decreases, however, the power consumption of the node 108A can be reduced.

Figure 24:
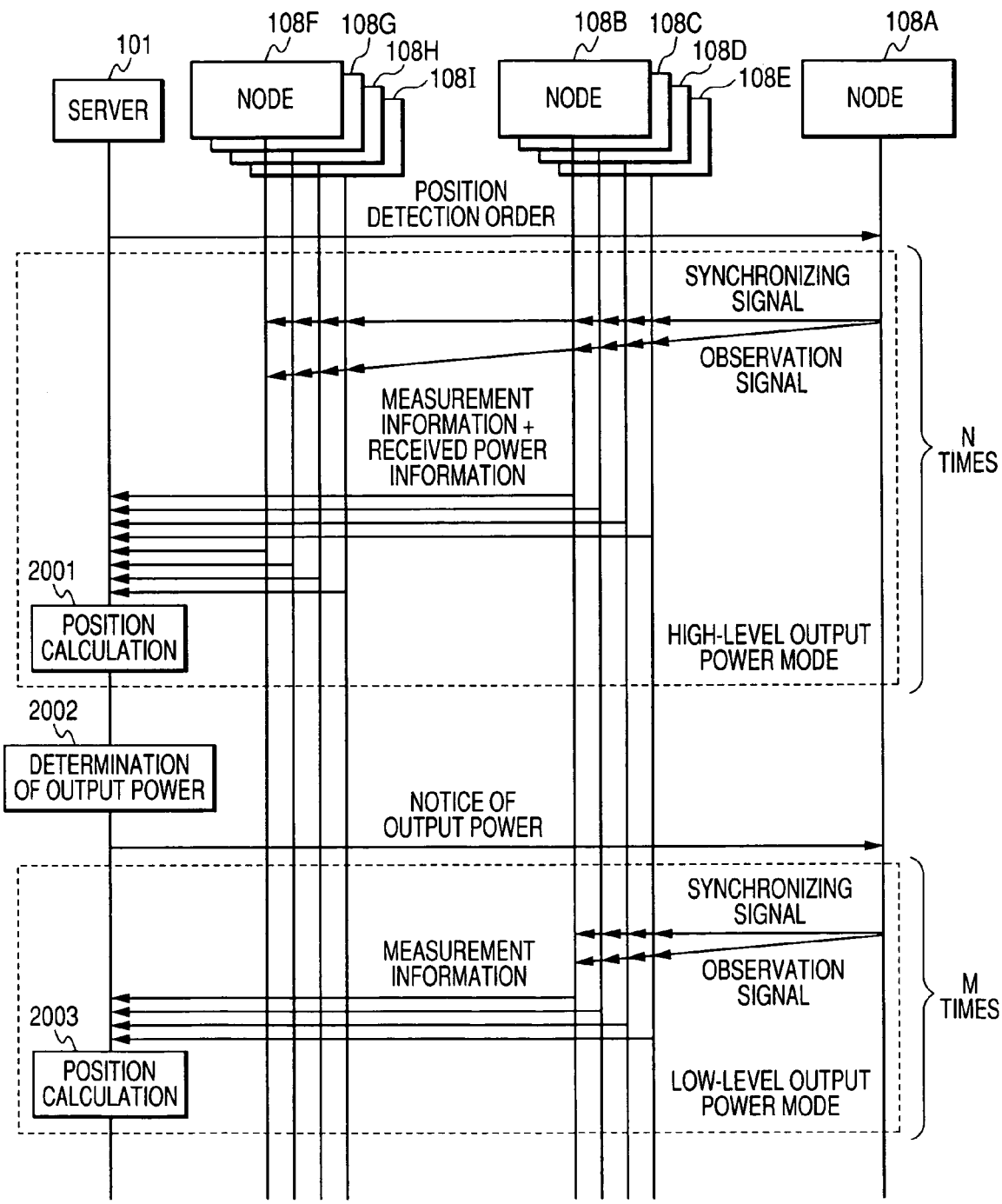
FIG. 24 is a sequence diagram showing the output power control in the position detection method 2 according to an aspect of the present invention.

FIG. 24 is a sequence diagram showing the output power control in the position detection method 2 according to an aspect of the present invention.

First, the server 101 sends a position detection order to the node 108A that is an object of position detection via access points 201 of a wireless communication method 2 and the wireless communication method conversion nodes 202.

The node 108A sends a synchronizing signal and an observation signal at the high output power level when the node 108A receives the position detection order.

Then, the nodes 108B, 108C, 108D, 108E, 108F, 108G, 108H and 108I existing in the range of the high-level output power mode receive the synchronizing signal and the observation signal from the node 108A. At this time, the nodes 108 existing in the range of the high-level output power mode measure the power of the received synchronizing signal. Further, the nodes check the received time of the synchronizing signal and the received time of the observation signal and store them.

Next, the nodes 108 existing in the range of the high-level output power mode obtain time difference between the synchronizing signal and the observation signal by subtracting the received time of the synchronizing signal from the stored received time of the observation signal. The nodes use the obtained time difference between the synchronizing signal and the observation signal for measurement information.

Next, the nodes send the obtained measurement information and measured received power information to the server 101.

The server 101 receives the measurement information and the received power information from the nodes 108 existing in the range of the high-level output power mode. The server calculates a position of the node 108A based upon the received measurement information (2001).

The server 101, the nodes 108 repeat the above-mentioned operation in the high-level output power mode by a predetermined frequency (for example, N times).

Next, the server 101 determines the output power level of the synchronizing signal and the observation signal based upon the received information of received power (2002).

The server 101 specifies the node 108B and others required for the detection of a position of the node 108A at the minimum. The server selects the nodes 108 the power received by which of a synchronizing signal is the least out of the specified nodes 108. Next, the server 101 subtracts the received power of a synchronizing signal received by the selected node 108B from the transmission power of the synchronizing signal sent by the node 108A that is the object of position detection when the synchronizing signal is sent. Hereby, the server 101 obtains propagation loss between the node 108B the received power of the synchronizing signal received by which is the least and the node 108A that is the object of position detection. The server 101 may also store the transmission power of a synchronizing signal sent by the node 108A beforehand and may be also notified of it by the node 108A.

Next, the server 101 determines an output power level of a synchronizing signal and an observation signal based upon the propagation loss between the nodes 108 as described in relation to FIG. 22.

The server 101 notifies the node 108A of the determined output power level.

The node 108A sends a synchronizing signal and an observation signal at the notified output power level when the node receives the notice of the output power level. In this case, the node 108A sends a synchronizing signal and an observation signal at the low output power level.

Then, the nodes 108B, 108C, 108D and 108E existing in the range of the low-level output power mode receive the synchronizing signal and the observation signal from the node 108A. At this time, the nodes 108 existing in the range of the low-level output power mode check the received time of the synchronizing signal and the received time of the observation signal and store them.

Next, the nodes 108 existing in the range of the low-level output power mode obtain time difference between the synchronizing signal and the observation signal by subtracting the received time of the synchronizing signal from the stored received time of the observation signal. The node 108B and others send the obtained time difference between the synchronizing signal and the observation signal to the server 101 as measurement information.

The server 101 receives the measurement information from the node 108B and others existing in the range of the low-level output power mode. The server calculates a position of the node 108A based upon the received measurement information (2001). The server 101 may also calculate a position of the node 108A also using measurement information received from the nodes 108F, 108G, 108H and 108I in the high-level output power mode.

The server 101, the nodes 108 repeat the above-mentioned operation in the low-level output power mode by a predetermined frequency (for example, M times).

As described above, the server 101 can detect a position of the node 108A, controlling the output power of the nodes 108 according to the position detection method 2.

Figure 25:
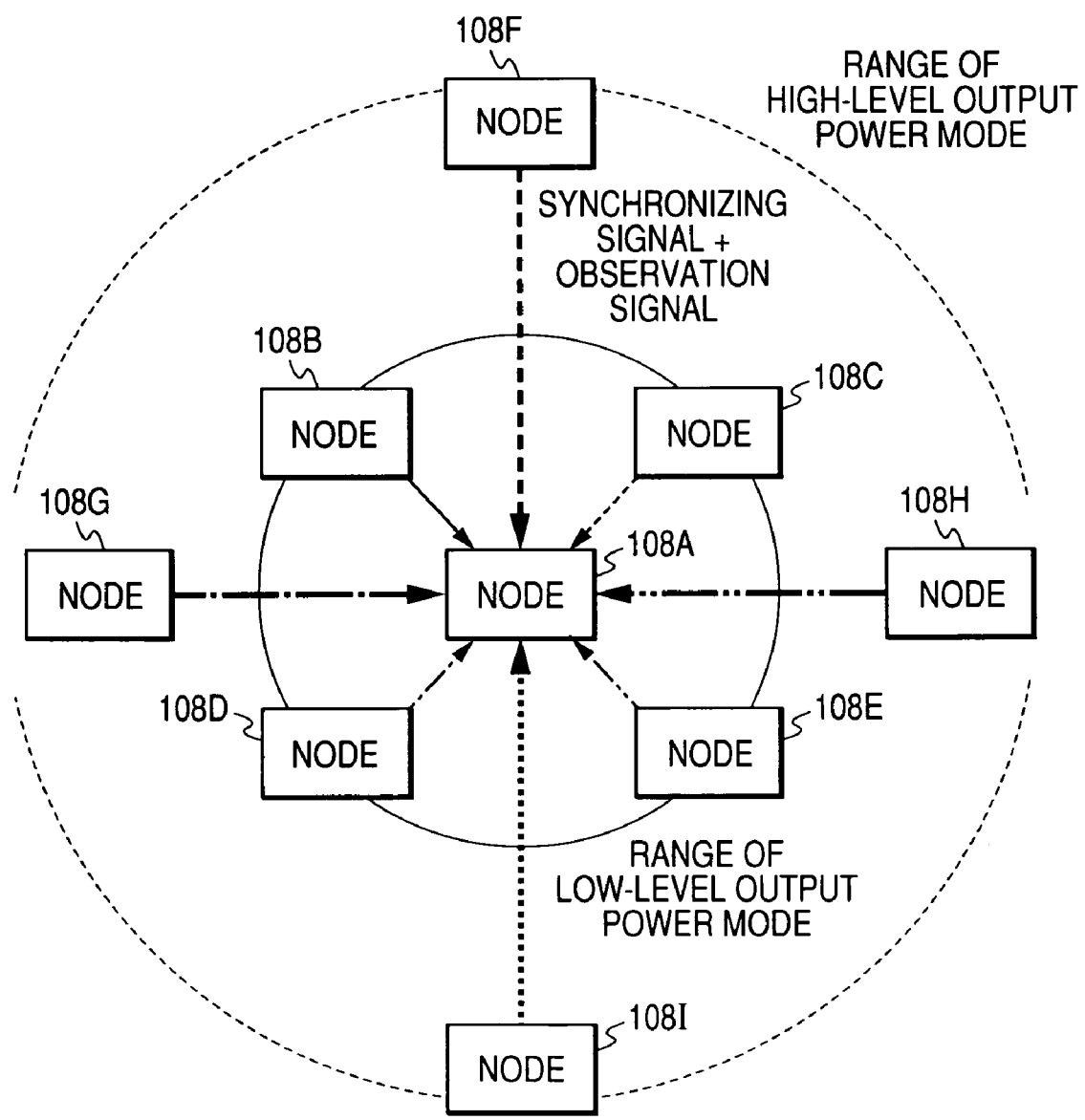
FIG. 25 is an explanatory drawing for explaining output power control in a position detection method 3 according to an aspect of the present invention.

FIG. 25 is an explanatory drawing for explaining output power control in a position detection method 3 according to an aspect of the present invention.

In this explanatory drawing, the server 101 detects a position of the node 108A.

The nodes 108B, 108C, 108D, 108E, 108F, 108G, 108H and 108I existing around the node 108A send a synchronizing signal and an observation signal at respective different output power levels.

For example, suppose that in the high-level output power mode, the nodes 108B, 108C, 108D, 108E, 108F, 108G, 108H and 108I existing in the range of the high-level output power mode send a synchronizing signal and an observation signal at the high output power level.

Besides, suppose that in the low-level output power mode, the nodes 108B, 108C, 108D and 108E existing in the range of the low-level output power mode send a synchronizing signal and an observation signal at the low output power level.

FIG. 26 is a sequence diagram showing the output power control in the position detection method 3 according to an aspect of the present invention.

First, the server 101 sends a position detection order to the nodes 108B, 108C, 108D, 108E, 108F, 108G, 108H and 108I existing in the range of the high-level output power mode via the access point 201A and others of the wireless communication method 2, the wireless communication method conversion nodes 202.

Then, the nodes 108 existing in the range of the high-level output power mode send a synchronizing signal and an observation signal at transmission timing included in the position detection order.

The node 108A receives the synchronizing signal and the observation signal from the nodes 108 existing in the range of the high-level output power mode. At this time, the node 108A measures the received power of the received synchronizing signal. The node 108A measures the received power of the synchronizing signal from all the nodes 108 existing in the range of the high-level output power mode. Further, the node 108A checks the received time of the synchronizing signal and the received time of the observation signal and stores them.

Next, the node 108A obtains time difference between the synchronizing signal and the observation signal by subtracting the received time of the synchronizing signal from the stored received time of the observation signal. The node 108A obtains time difference as to all the nodes 108 existing in the range of the high-level output power mode. The node 108A uses the obtained time difference between the synchronizing signal and the observation signal for measurement information.

Next, the node 108A sends the obtained measurement information and the measured received power information to the server 101.

The server 101 receives the measurement information and the received power information from the nodes 108. The server calculates a position of the node 108A based upon the received measurement information (2201).

The server 101, the nodes 108 repeat the above-mentioned operation in the high-level output power mode by a predetermined frequency (for example, N times).

Next, the server 101 determines an output power level of a synchronizing signal and an observation signal based upon the received information of received power (2202).

The server 101 specifies the nodes 108 required for the detection of a position of the node 108A which is the object of position detection at the minimum. The server selects the nodes 108 that send the synchronizing signal which is received by the node 108A and the received power of which is the least out of the specified node 108B and others. Next, the server 101 subtracts the received power of the synchronizing signal from the selected nodes 108 from the transmission power of the synchronizing signal by the selected nodes 108. Hereby, the server 101 obtains propagation loss between the selected node 108B and others and the node 108A that is the object of position detection. The server 101 may also store the transmission power of a synchronizing signal by the nodes 108 beforehand and may be also notified of it from the nodes 108.

The server 101 notifies the nodes 108B, 108C, 108D and 108E existing in the range of the low-level output power mode of the determined output power level.

When the nodes 108 existing in the range of the low-level output power mode are notified of the output power level, the nodes send a synchronizing signal and an observation signal at the notified output power level. In this case, the nodes 108 existing in the range of the low-level output power mode send a synchronizing signal and an observation signal at the low output power level.

The node 108A receives the synchronizing signal and the observation signal from the nodes 108 existing in the range of the low-level output power mode. At this time, the node 108A checks the received time of the synchronizing signal and the received time of the observation signal and stores them. Next, the node 108A obtains time difference between the synchronizing signal and the observation signal by subtracting the received time of the observation signal from the stored received time of the observation signal. The node 108A obtains time difference as to all the nodes 108 existing in the range of the low-level output power mode. The node 108A uses the obtained time difference between the synchronizing signal and the observation signal for measurement information.

Next, the node 108A sends the obtained measurement information to the server 101.

The server 101 receives the measurement information from the nodes 108. The server calculates a position of the node 108A based upon the received measurement information (2203). The server 101 may also calculate a position of the node 108A also using measurement information received from the nodes 108F, 108G, 108H and 108I in the high-level output power mode.

The server 101, the nodes 108 repeat the above-mentioned operation in the low-level output power mode by a predetermined frequency (for example, M time).

As described above, the server 101 can detect a position of the node 108A, controlling the output power of the nodes 108 according to the position detection method 3.

In this embodiment, the output power control in the position detection methods 2 and 3 has been described. Similarly, the server 101 can also control the output power of the nodes 108 according to position detection methods 1, 4 and 5.

According to this aspect of the present invention, as described, the power consumption of the node 108A and others can be further reduced.

The invention can be applied to a wireless communication system for calculating a position of a node.

Those of ordinary skill in the art may recognize that many modifications and variations of the present invention may be implemented without departing from the spirit or scope of the invention. Thus, it is intended that the present invention covers the modifications and variations of this invention provided they come within the scope of the appended claims and their equivalents.

What is claimed is:

1. A wireless communication system comprising:
   a plurality of nodes that mutually communicate, said plurality of nodes including at least one node which has a battery therein that supplies power internally, said at least one node measuring a status of the battery therein, and notifying a server of the measured status of the battery therein; and
   said server which detects a position of said at least one node using communication between said plurality of nodes, determines a position detection method for said at least one node based upon the measured status of the battery of said at least one node, and calculates said position of said at least one node by the determined position detection method, wherein:

said at least one node sends a synchronizing signal used for the synchronization of time between said plurality of nodes and an observation signal used for the measurement of distance between others of said plurality of nodes and said at least one node;

at least a second of said plurality of nodes receives the synchronizing signal and the observation signal from said at least one node; and said server calculates the position of said at least one node based upon difference between time at which said at least a second of said plurality of nodes receives the synchronizing signal and time at which said at least a second of said plurality of nodes receives the observation signal.

2. A wireless communication system, comprising:

a plurality of nodes that mutually communicate, said plurality of nodes including at least one node which has a battery therein that supplies power internally, said at least one node measuring a status of the battery therein, and notifying a server of the measured status of the battery therein;

said server which detects a position of said at least one node using communication between said plurality of nodes, determines a position detection method for said at least one node based upon the measured status of the battery of said at least one node, and calculates said position of said at least one node by the determined position detection method; and a synchronizing signal transmitter that sends a synchronizing signal used for the synchronization of time between said plurality of nodes, wherein said at least one node sends an observation signal used for the measurement of distance between others of said plurality of nodes;

said synchronizing signal transmitter sends a synchronizing signal upon receipt of the observation signal from said at least one node;

at least a second of said plurality of nodes receives the observation signal from said at least one node and receives the synchronizing signal from said synchronizing signal transmitter; and said server calculates the position of said at least one node based upon difference between time at which said at least a second of said plurality of nodes receives the synchronizing signal and time at which said at least a second of said plurality of nodes receives the observation signal.

3. A wireless communication system comprising:

a plurality of nodes that mutually communicate, said plurality of nodes including at least one node which has a battery therein that supplies power internally, said at least one node measuring a status of the battery therein, and notifying a server of the measured status of the battery therein; and said server which detects a position of said at least one node using communication between said plurality of nodes, determines a position detection method for said at least one node based upon the measured status of the battery of said at least one node, and calculates said position of said at least one node by the determined position detection method, wherein said at least one node measures the power of a received synchronizing signal, said synchronizing signal being used for the synchronization of time between at least a set of said plurality of nodes, and said at least one node notifies said server of the measured received power, and said server determines the output power of an observation signal based upon the notified measured received power and notifies said at least one node of the determined output power.

4. A wireless communication system according to claim 3, wherein:

said at least one node controls the output power of an observation signal based upon said notice from said server.

5. A node position calculation method that detects the position of at least one node using communication between a plurality of nodes, said method comprising:

obtaining the status of a battery of the at least one node;

determining a position detection method of the at least one node based upon the obtained status of the battery;

calculating the position of the at least one node by the determined position detection method;

sending of a synchronizing signal by the at least one node used for the synchronization of time between the plurality of nodes and sending of an observation signal used for the measurement of distance between the plurality of nodes;

receiving, by others of the plurality of nodes, the synchronizing signal and the observation signal from the at least one node; and calculating, at the server, the position of the at least one node based upon the time difference of each of said receiving nodes receipt of the synchronizing signal and the observation signal.

6. A node position calculation method that detects the position of at least one node using communication between a plurality of nodes, said method comprising:

obtaining the status of a battery of the at least one node;

determining a position detection method of the at least one node based upon the obtained status of the battery;

calculating the position of the at least one node by the determined position detection method;

sending of an observation signal by the at least one node for the measurement of distance;

transmitting a synchronizing signal from a transmitter station, said synchronizing signal being used for the synchronization of time between the plurality of nodes, said transmitting being responsive to receipt of said sent observation signal;

receiving the observation signal from the at least one node and the synchronizing signal from the transmitter station by other of the plurality of nodes; and calculating a position of the node based upon difference between time at which each of the plurality of nodes receives the synchronizing signal and the observation signal.

\* \* \* \* \*